C. BARTELS & G. T. REISS.
J. L. BLAIR & E. G. RUDER, ADMINISTRATORS OF G. T. REISS, DEC'D.
GRINDING MACHINE.
APPLICATION FILED MAR. 18, 1916.
1,193,661.
Patented Aug. 8, 1916.
14 SHEETS—SHEET 1.
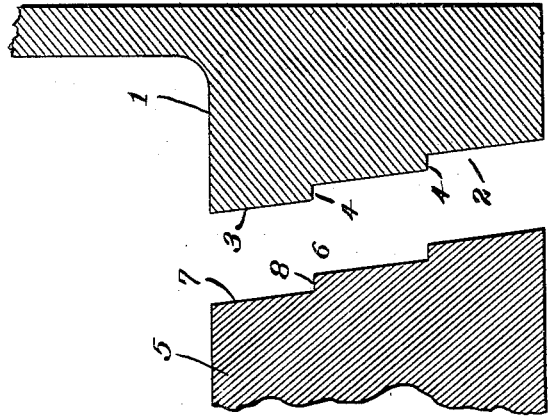
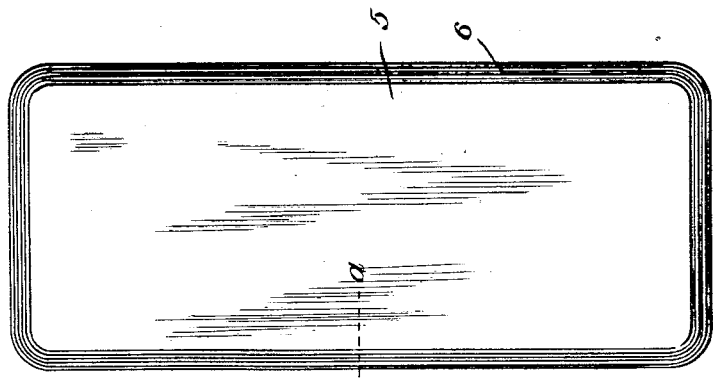
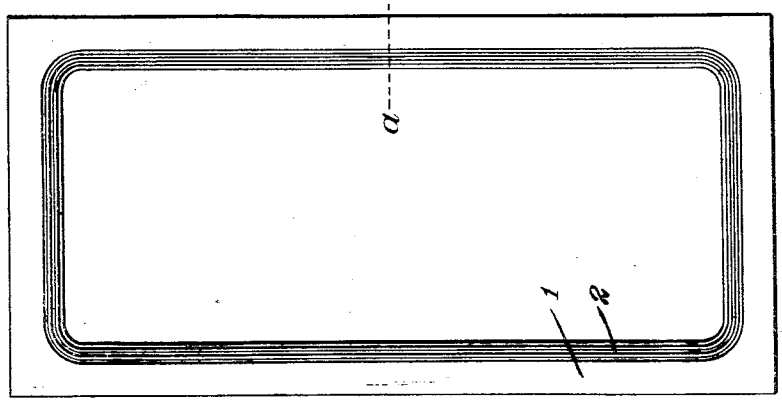
Carl Bartels, Joint Inventor.
Joseph L. Blair and Ernst G. Ruder,
Administrators of the Estate of George T. Reiss, Joint Inventor.
Witness:
Geo. Johnson
by James W. See
Attorney

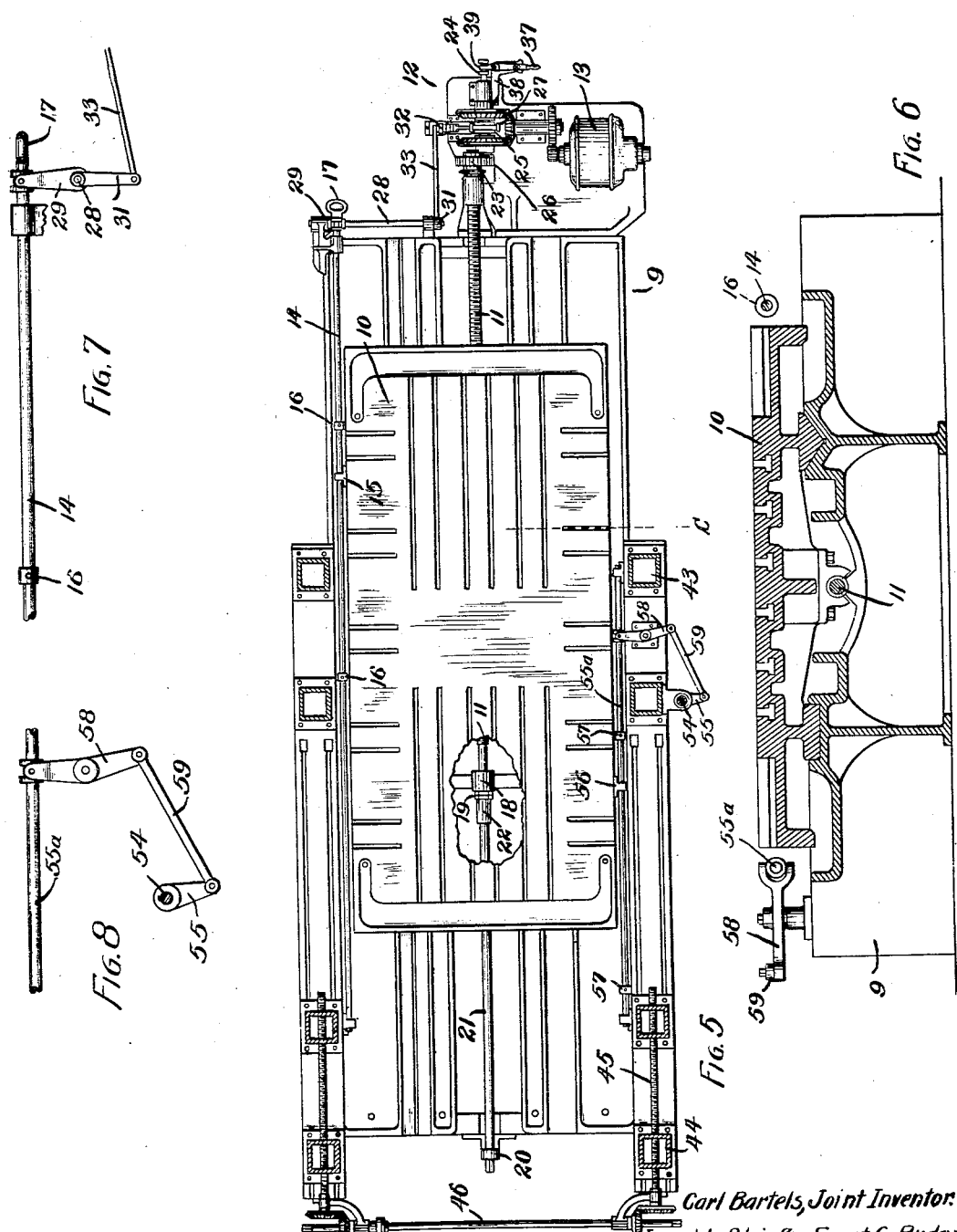

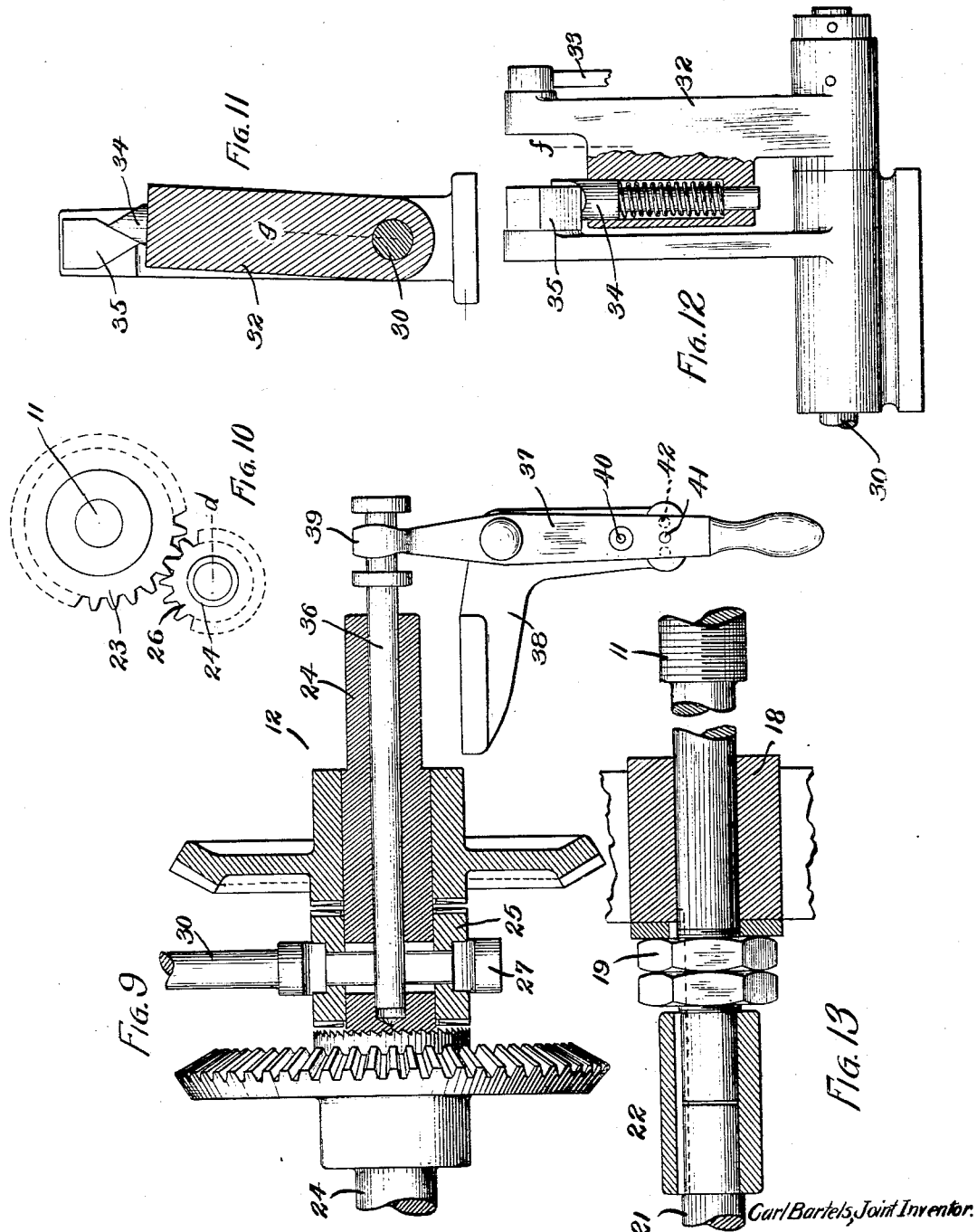

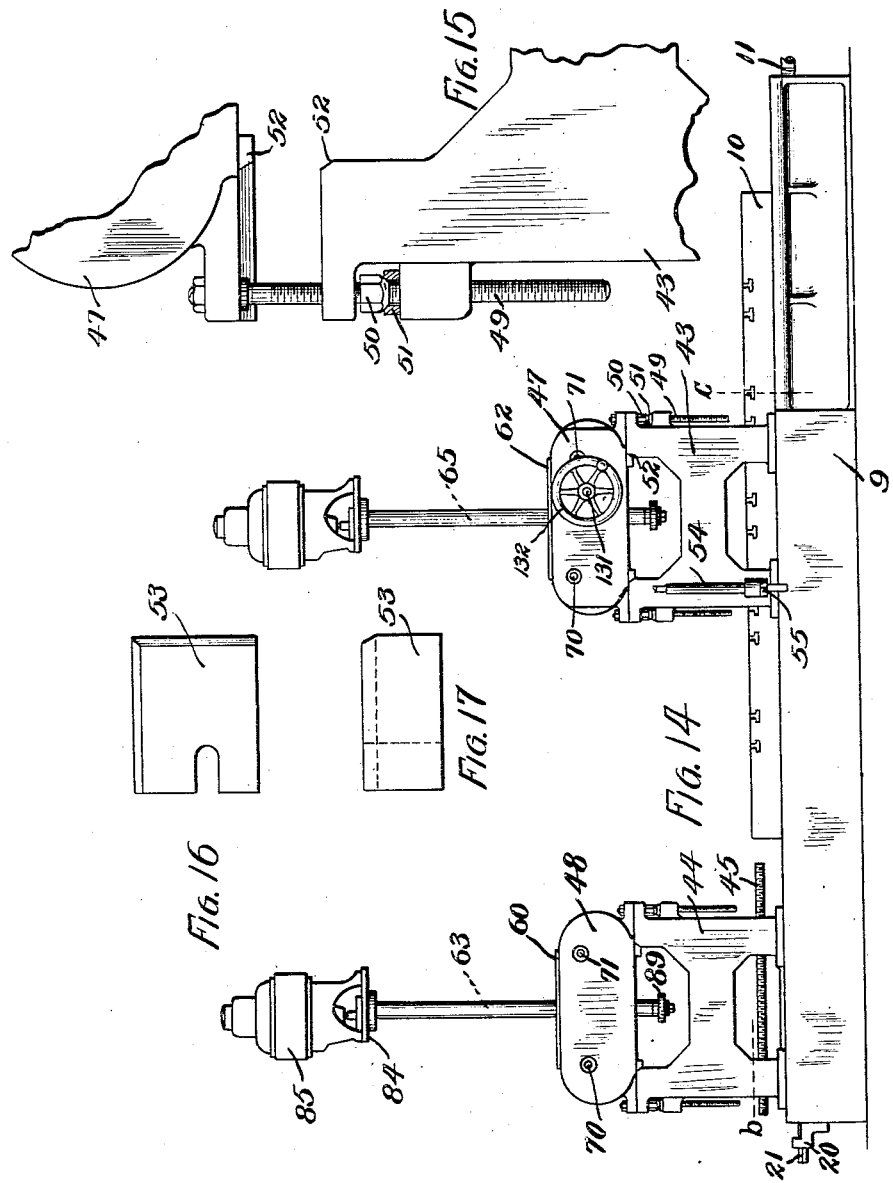

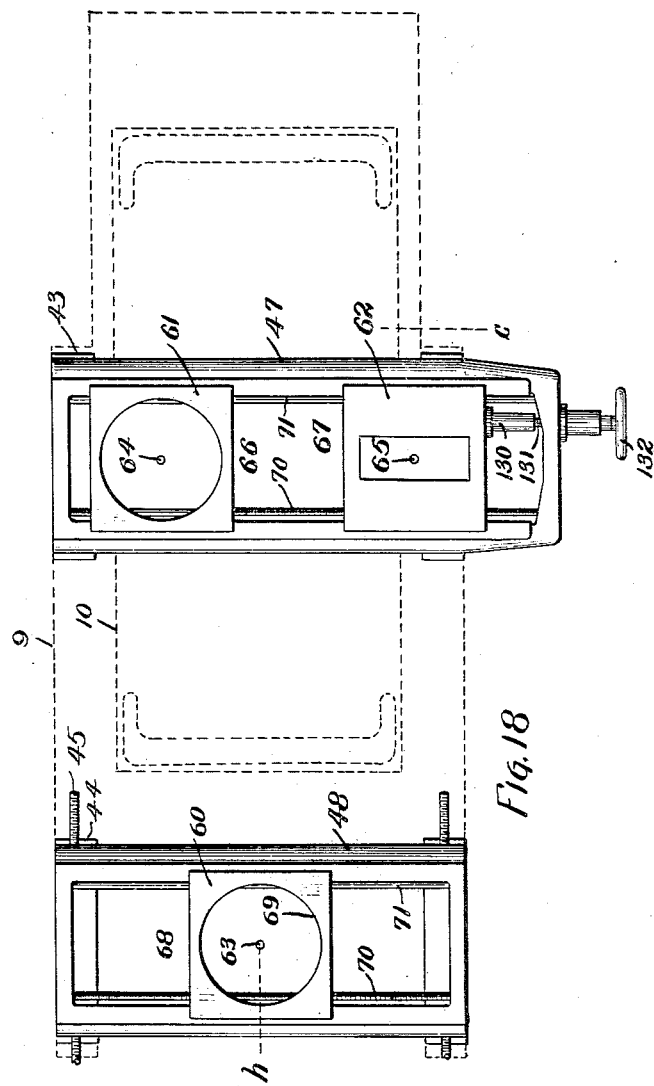

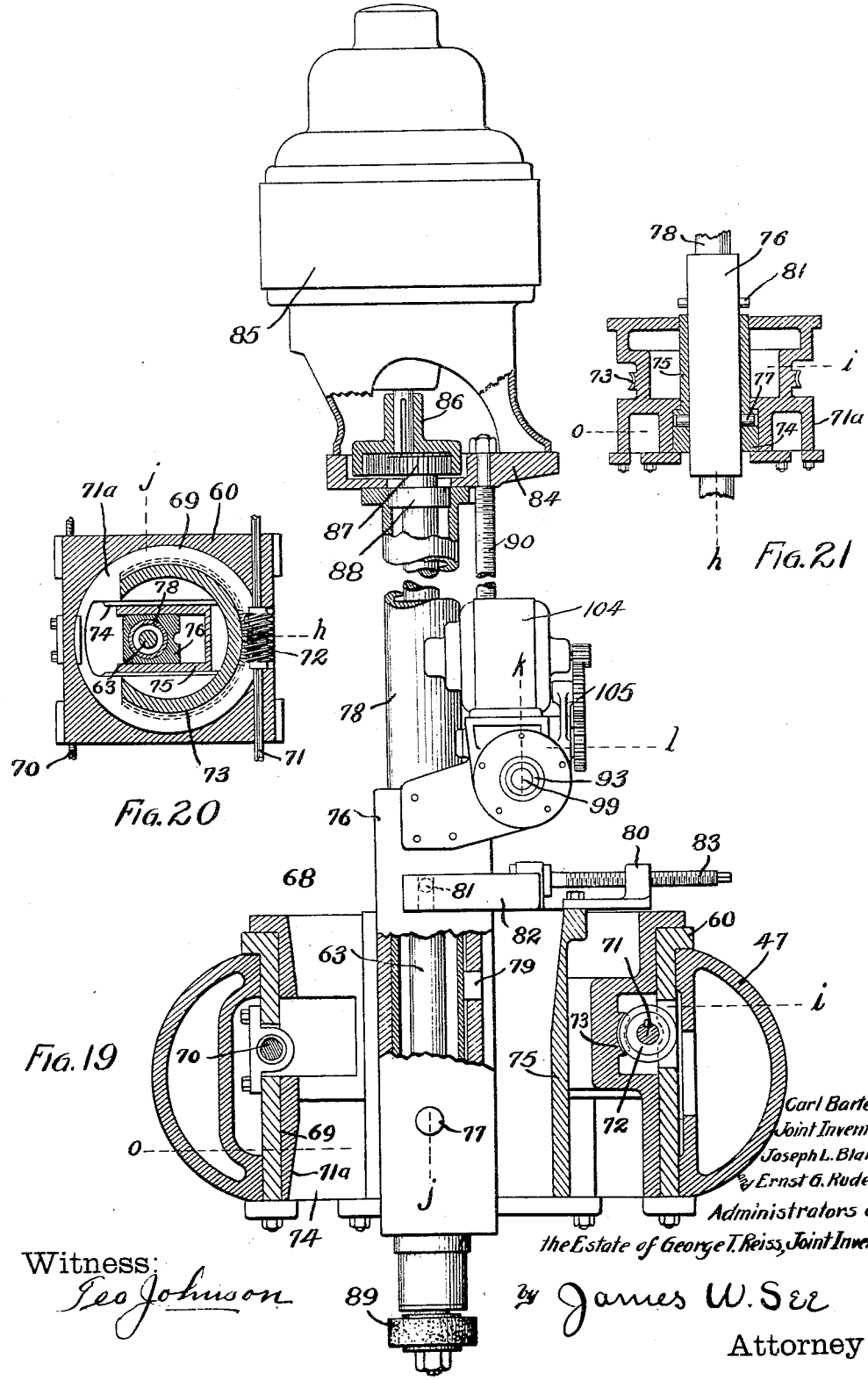

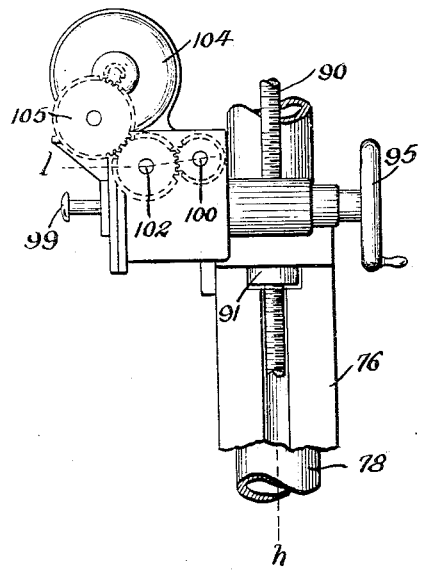
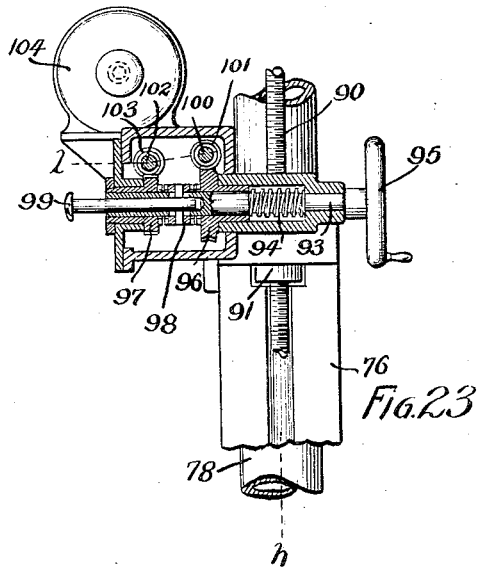
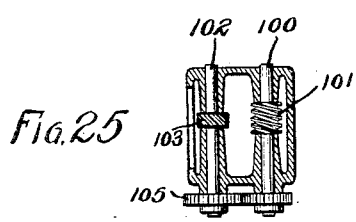
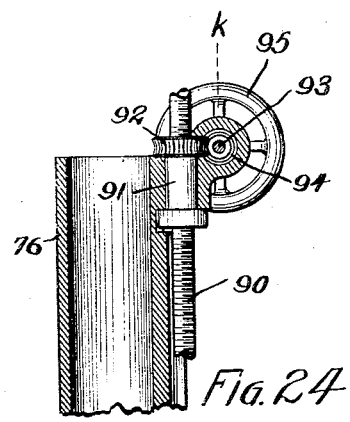

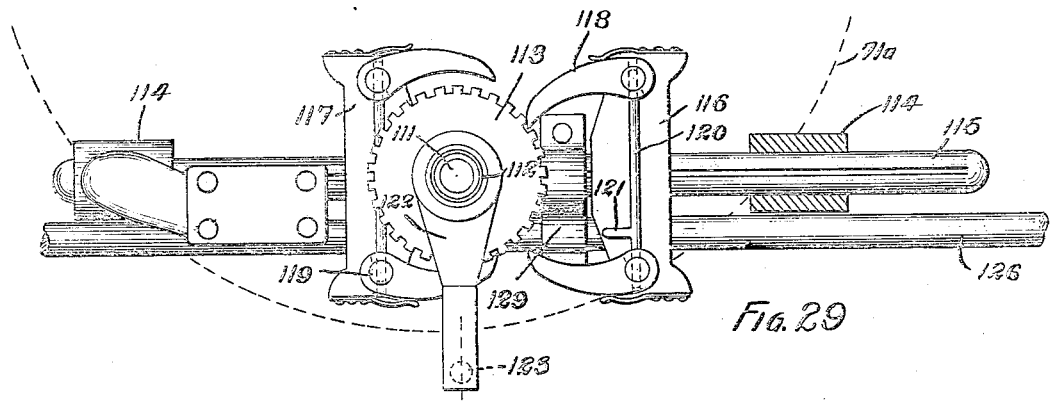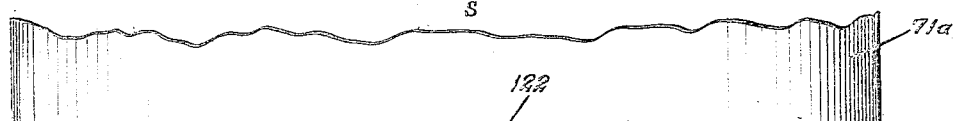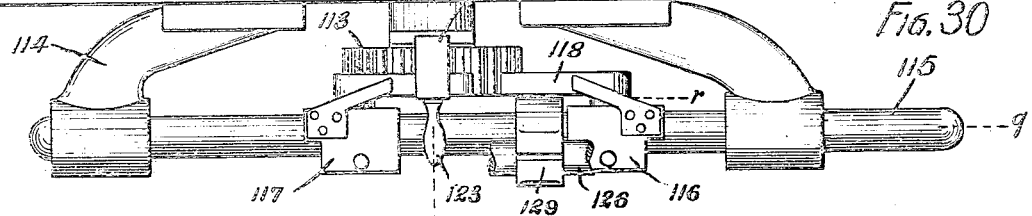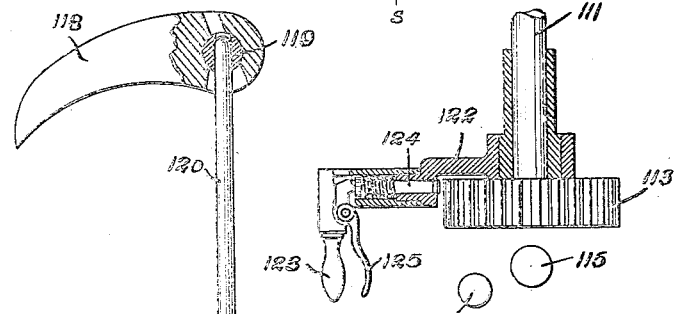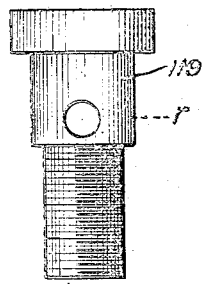

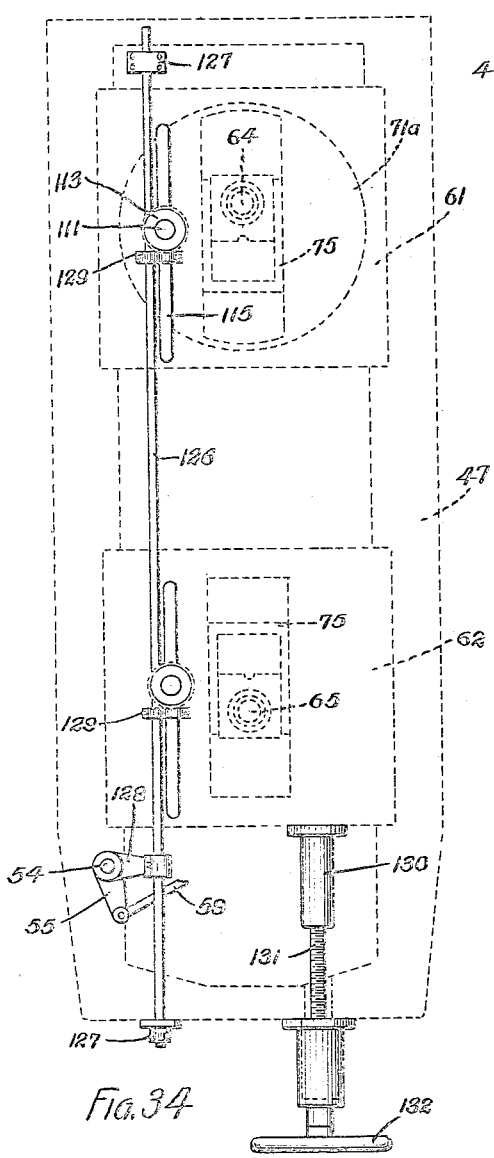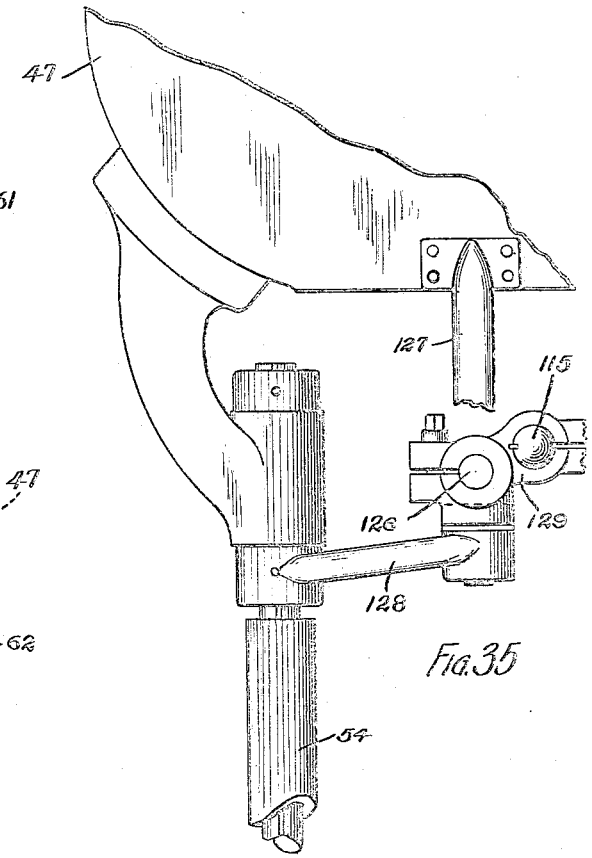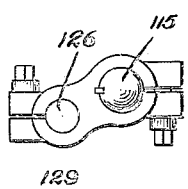

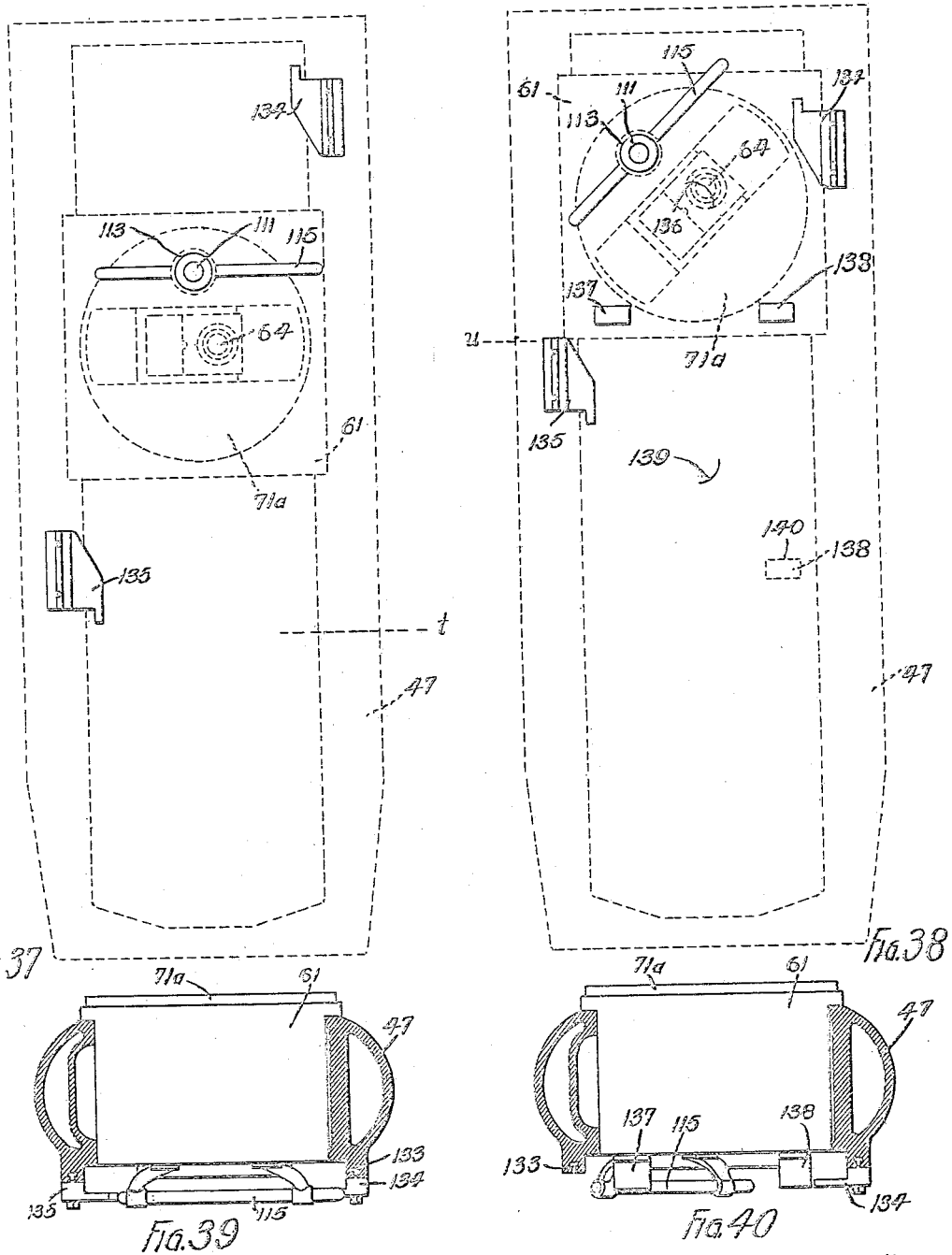

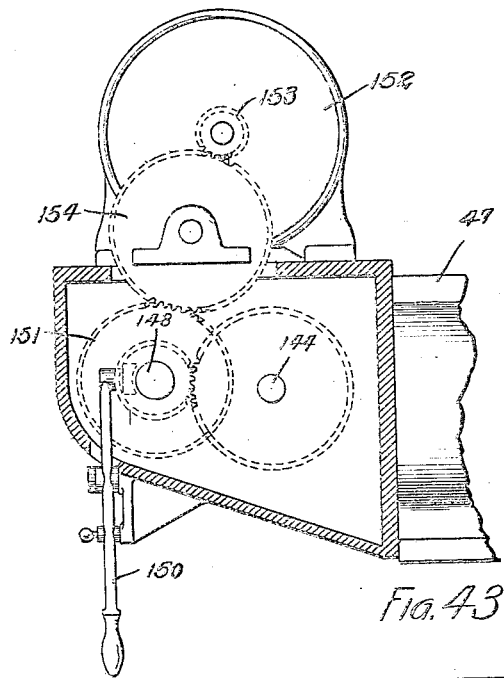
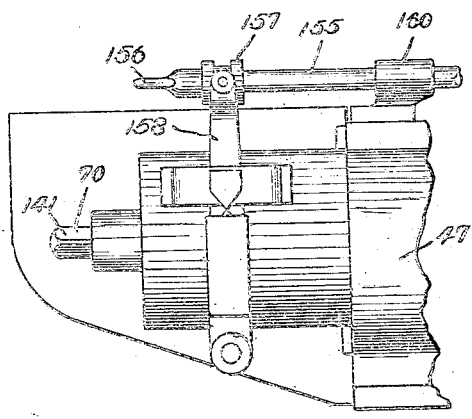
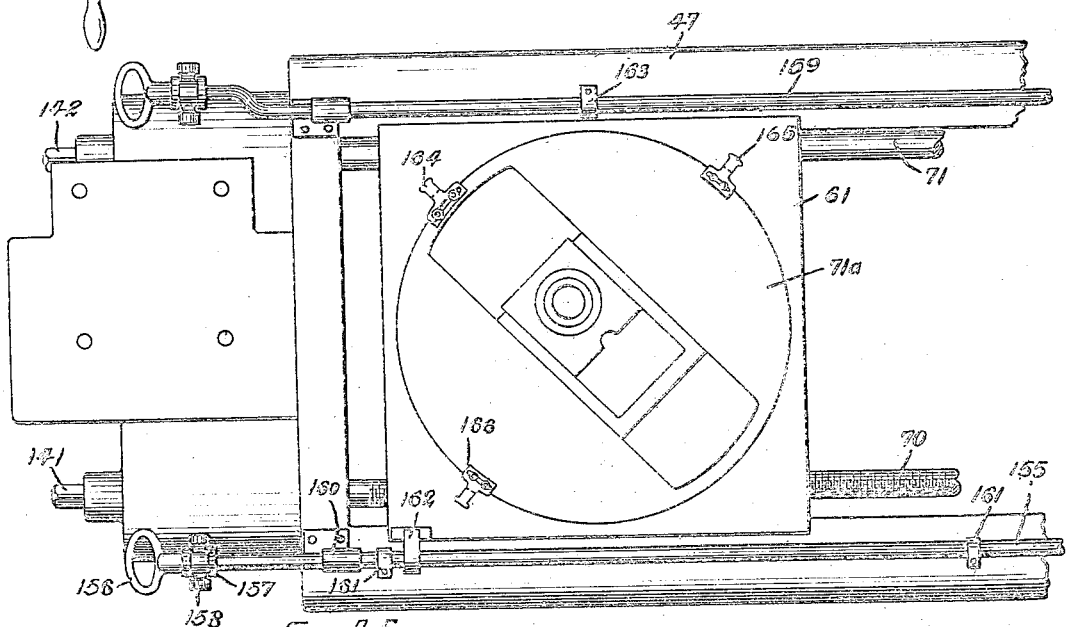

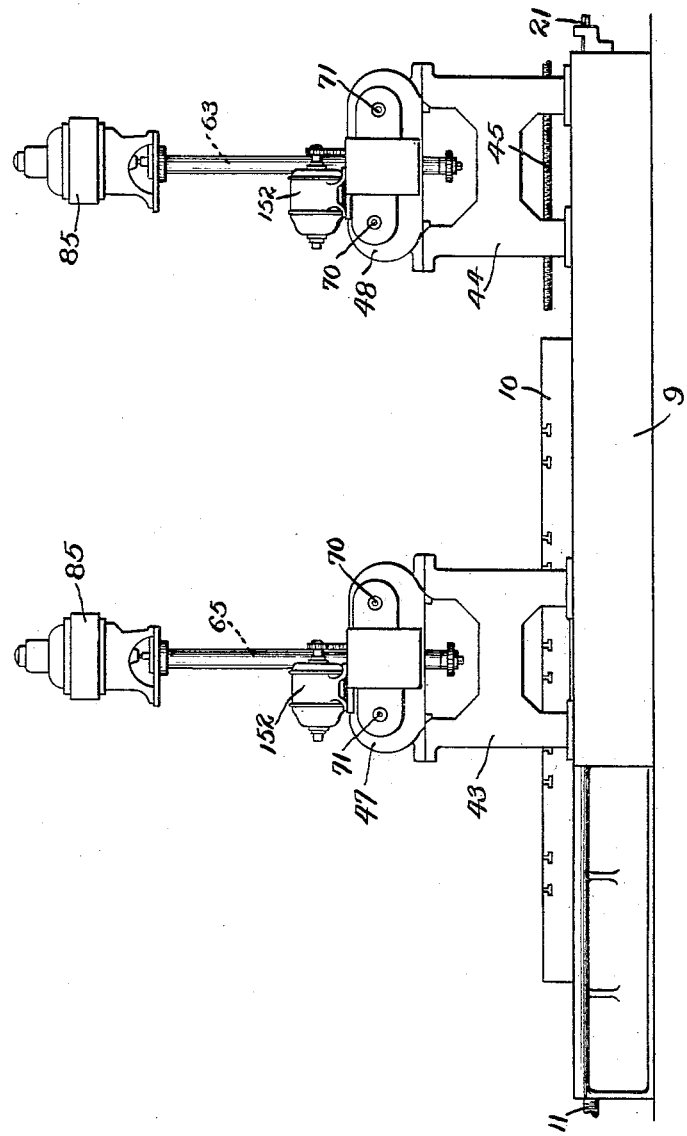

UNITED STATES PATENT OFFICE.

CARL BARTELS, OF HAMILTON, OHIO, AND GEORGE T. REISS, DECEASED, BY JOSEPH L. BLAIR AND ERNST G. RUDER, ADMINISTRATORS, OF HAMILTON, OHIO, ASSIGNORS TO THE MOSLER SAFE COMPANY, OF NEW YORK, N. Y.

GRINDING-MACHINE.

1,193,661. Specification of Letters Patent. Patented Aug. 8, 1916.

Application filed March 18, 1916. Serial No. 85,204.

*To all whom it may concern:*

Be it known that CARL BARTELS, a citizen of the United States, and a resident of Hamilton, Butler county, Ohio, and GEORGE T. REISS, deceased, who was a citizen of the United States and a resident of Hamilton, Butler county, Ohio, did invent certain new and useful Improvements in Grinding-Machines, of which the following is a specification.

This invention pertaining to grinding machines, while of utility in other connections was designed with special reference to the grinding of stepped edges of safe doors and stepped door-jambs, which the doors were to fit.

In its general aspect the machine comprises a reciprocating table on which may be bolted the door or door-frame to be ground; a pair of rails fixedly supported above the table; substantially vertical grinding spindles carried by the rails and carrying grinding wheels adapted to grind the side margins of the door and the interior of the door-frame and to round the corners of their steps.

The invention will be readily understood from the following description taken in connection with the accompanying drawings in which:—

Figure 26:
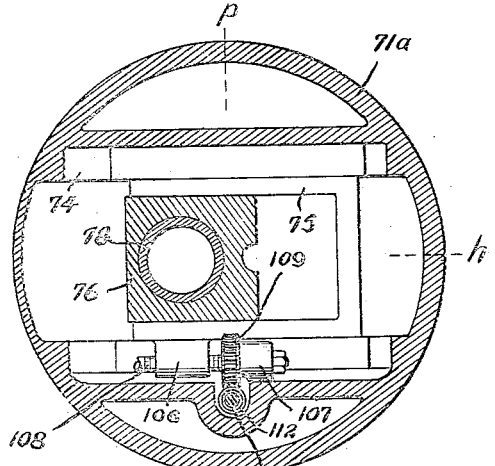
Figure 27:
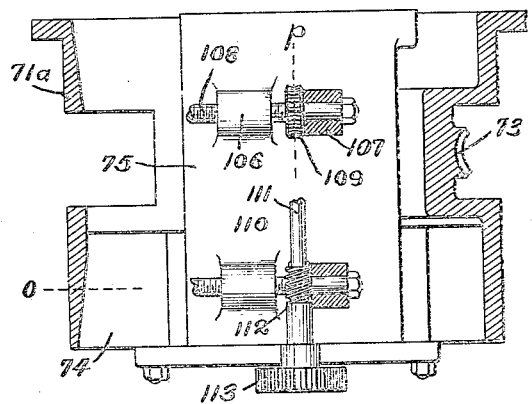
Figure 28:
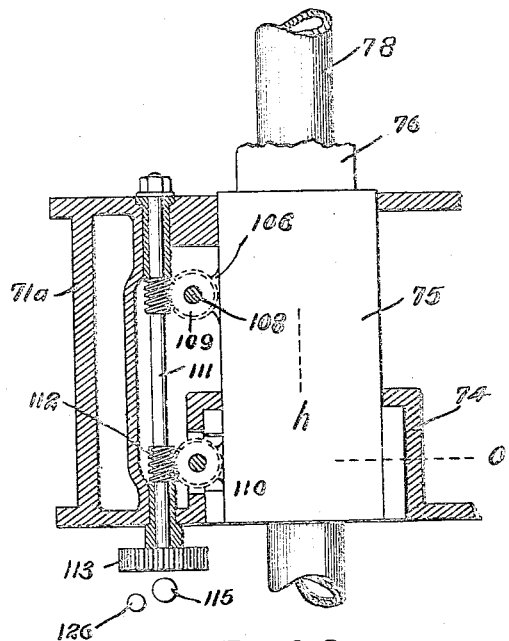
Figure 41:
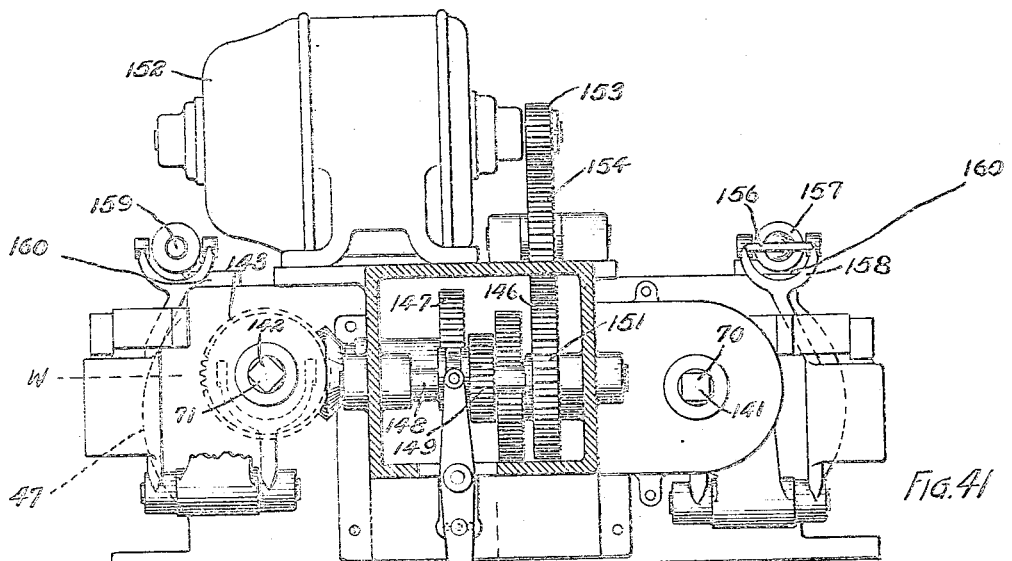
Figure 42:
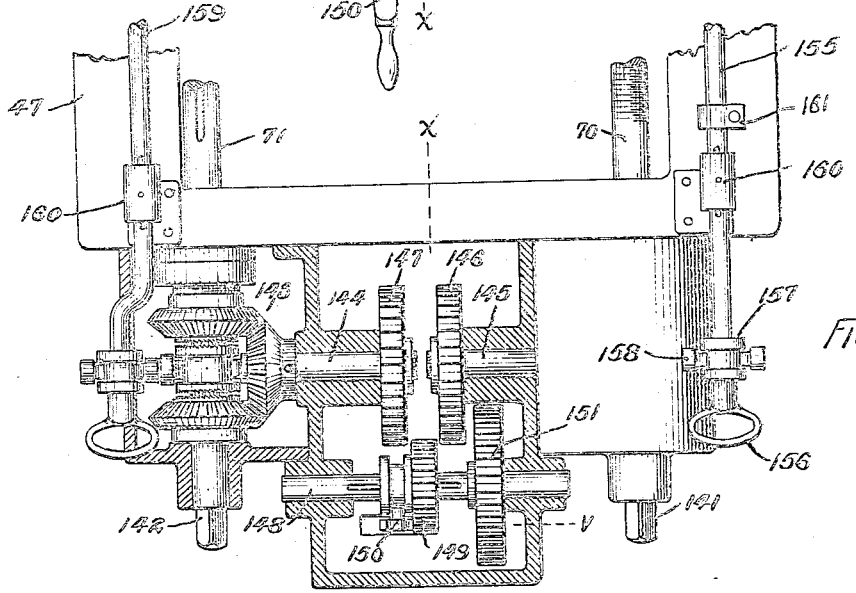

Figure 1 is a front elevation of a doorframe, the stepped jamb of which is to be ground: Fig. 2 a rear elevation of the door whose stepped margin is to be ground to fit the jamb in the door-frame: Fig. 3 a horizontal section at one edge of the door in the plane of line $a$ of Fig. 2: Fig. 4 a horizontal section of a portion of the door-jamb in the plane of line $a$ of Fig. 1: Fig. 5 a plan of the bed and table of the machine, housing-parts appearing in the plane of line $b$ of Fig. 14: Fig. 6 a transverse section of the bed and table in the plane of line $c$ of Figs. 5 and 14 and 18: Fig. 7 an elevation of parts of the table shipper-rod mechanism: Fig. 8 a plan of the vertical feed-shaft shipper-rod mechanism: Fig. 9 a plan of the table reversing gearing, parts appearing in the plane of line $d$ of Fig. 10: Fig. 10 an elevation of the gears connecting the main table-screw with the countershaft driving it: Fig. 11 an elevation of the flipping device for causing the reversing clutch of the table driving screw to go to an active position after it has been shifted from one active position past the neutral point, a portion of the device appearing in the plane of line $f$ of Fig. 12: Fig. 12 an elevation of the same mechanism, a portion appearing in the plane of line $g$ of Fig. 11: Fig. 13 a horizontal section of the coupling between the main table-screw and its extension shaft: Fig. 14, a side elevation of the bed and table in conjunction with the housings and rails and, rudimentarily, the grinding spindles: Fig. 15, a side elevation, on an enlarged scale, of a portion of one of the housings and a portion of one of the rails in conjunction with the rail-elevating mechanism: Fig. 16, a plan of one of the blocks employed when the rail is to be given an extra elevation: Fig. 17, a side elevation of this block: Fig. 18, a diagrammatic plan of the bed, table, rails and grinding heads: Fig. 19, a vertical section of grinding-head 68 in the plane of line $h$ of Figs. 18, and 20 and 21: Fig. 20, a horizontal section of the same grinding-head in the plane of line $i$ of Figs. 19 and 21: Fig. 21, a vertical section of portions of the same grinding-head in the plane of line $j$ of Figs. 19 and 20: Fig. 22 an elevation of the righthand side of that portion of grinding-head 68 concerned immediately with the means for vertically feeding the spindle of that grinding-head: Fig. 23 a similar elevation, with parts appearing in the plane of line $k$ of Figs. 19 and 24: Fig. 24 a vertical section of the portion of the sleeve of this grinding-head, in the plane of line $h$ of Figs. 18, 21, 22 and 23: Fig. 25 a horizontal section of the vertical feeding mechanism of this grinding-head in the plane of line $l$ of Figs. 19, 22 and 23: Fig. 26 a horizontal section in the plane of line $o$ of Figs. 19, 21, 27 and 28 of one of the drums $71^a$, shown in conjunction with its immediate infeed mechanism: Fig. 27 a vertical section of the drum in the plane of line $h$ of Figs. 20, 21, 26, and 28, the slide being shown in elevation: Fig. 28 a vertical section of a portion of the drum in the plane of line $p$ of Figs. 26 and 27: Fig. 29, a plan of one of the infeed pawl mechanisms, a portion appearing in horizontal section in the plane of line *q* of Fig. 30: Fig. 30, a side elevation of the same: Fig. 31, a plan of a pair of the infeed pawls and their locking rod, parts appearing in the plane of line *r* of Figs. 30 and 33: Fig. 32, a vertical section of a portion of this infeed mechanism in the plane of line *s* of Figs. 29 and 30: Fig. 33, a side elevation of the pivot of one of the pawls of this infeed mechanism. Fig. 34, a plan of those portions of the mechanism which are mounted on the long rail for giving the infeed to the grinding-wheels carried by the long rail, this infeed being derived from the motion of the table of the machine: Fig. 35, an end view of a portion of the long rail, with certain mechanism carried by it: Fig. 36, an end view of the short rod whose reciprocations bring about the intermittent infeeding motion of the two grinding-wheels carried by the long rail. Fig. 37 a plan of those portions of the mechanism which are mounted on the long rail for giving the infeed motion to the grinding-wheel carried by the long rail and employed in grinding across the end of the work: Fig. 38 a similar view showing the parts for giving the infeed when rounding corners: Fig. 39 a side elevation of the parts appearing in Fig. 37, the long rail appearing in transverse section in the plane of line *t* of Fig. 37: Fig. 40 a similar side elevation of the parts appearing in Fig. 38, the long rail appearing in section in the plane of line *u* of Fig. 38: Fig. 41 an end view of one of the rails at the side of the machine, opposite that appearing in Fig. 14, showing the driving mechanism for the longitudinal screw and longitudinal splined rod, parts appearing in section in the plane of line *v* of Fig. 42, the handle of the shipper-rod pertaining to the splined rod being omitted: Fig. 42 a plan of the same, parts appearing in section in the plane of line *w* of Fig. 41: Fig. 43 a side view of the driving and reversing mechanism at the end of the rails, parts appearing in vertical section in the plane of line *x* of Figs. 41 and 42: Fig. 44 a side elevation of the same, showing the shipper-rod pertaining to the rail screw: Fig. 45 a plan of a portion of one of the rails, the long rail being chosen, illustrating the mechanism for automatically reciprocating the shipper-rods on the rail: and Fig. 46 a side elevation of the machine viewed at the side opposite the one shown in Fig. 14.

As the machine is large and the scale of the drawings necessarily small, it has been deemed wise to illustrate in many cases, a given sub-combination of mechanism pertaining to a given performance independent of other sub-combinations. In other words, in illustrating a given sub-combination there has been omitted from the drawings illustrating such sub-combinations some or all of the elements pertaining to other sub-combinations, thus avoiding confusion in the drawings and permitting the description to be more clearly concentrated upon the given sub-combination and its mode of operation.

In the drawings no attempt has been made to illustrate certain well known engineering expedients of practical utility, such as devices in the way of ball-bearings, etc., for reducing friction, devices for facilitating lubrication, details of motors and devices for controlling the motors, and graduations on relatively moving parts to facilitate their being adjusted to position.

In the drawings, referring for the present to Figs. 1 to 4 inclusive: 1, indicates the door-frame of a safe or of the vestibule of a vault; 2, the door-jamb therein; 3, the beveled steps of the door-jamb, the steps of the sides and top and bottom of the jamb being united by curves; 4, the outwardly presenting shoulders of the door-jamb; 5, the door, adapted to fit the door-jamb of the frame; 6, the margin of the door stepped to fit the steps of the door-jamb; 7, the beveled steps of the door; and 8, the shoulders uniting the steps of the door. Such a door-jamb and door illustrate articles which the machine constituting the present invention is designed to deal with, by grinding the bevels and shoulders of the door-jamb. It may be assumed in the case of safe work, that the door and jamb are of such material as manganese steel castings which can only be treated satisfactorily by grinding. The machine for doing this work involves a table reciprocating on a bed, after the manner of a metal planing machine, grinding wheels being supported by the machine to operate on the door or door-frame.

Proceeding with the drawings, and, for the present, giving consideration to Figs. 5 to 8 inclusive: 9, indicates a horizontal bed; 10, a table reciprocating in ways on the bed and provided with slots by means of which work may be bolted to its upper surface; 11, a screw journaled in the bed and engaging a nut carried by the table so that the table is reciprocated as the screw turns in one direction or the other; 12, reversing gearing connected with the screw to determine the direction of rotation of the screw; 13, a motor to give motion to the reversing gearing; 14, a slidable shipper-rod mounted in bearings on the bed alongside the table; 15, a dog carried by the table and having sliding engagement with the shipper-rod; 16, adjustable collars on the shipper-rod; and 17, a handle by means of which the shipper-rod may be moved endwise manually. The reversing mechanism is of not unusual bevel-geared type in which two bevel-gears are driven in opposite directions, suitable mechanism, operated by the shipper-rod serving to connect either one or the other of the bevel-gears with the screw so as to determine the direction of rotation of the screw. The motor 13, being in motion, turns the two bevel-gears in opposite directions, and, when one of the bevel-gears is in connection with the screw, the table will slide in one direction on the bed, and when dog 15 strikes one of the collars 16 it will cause the endwise movement of the shipper-rod and the consequent unclutching of the stated bevel-gear from its connection with the screw and the clutching of the other bevel-gear to the screw, whereupon the screw will reverse its direction of motion and the table will slide in the opposite direction. The length of the excursions of the table may be changed by adjusting the collars 16. As thus far referred to the mechanism is not materially different from that of metal planing machines. The work is done by grinding wheels and provision is to be made for properly supplying water at the points of grinding in case the material being operated upon is such as to call for wet grinding. In order to take care of such water, the table and bed are provided with drainage gutters so that the water going down to the table and bed may pass off and go to waste or be returned by suitable pumping mechanism to the point of grinding action.

Proceeding with the drawings, and giving consideration for the present to Figs. 5 and 13: 18 indicates a bearing supported by the bed of the machine and serving to support the tail-end of screw 11, the tail-end of the screw being the end farthest from its driving and reversing mechanism, and the bearing being at such distance from the head-end of the bed as will permit the nut of the table to have the proper extent of travel; 19, nuts upon the end of screw 11, tailward of bearing 18 and serving as means for taking up endwise lost motion of the screw; 20, (Fig. 5) a bearing at the tail-end of the bed, in line with screw 11; 21, a shaft journaled in bearing 20 and extending to near the tail-end of screw 11; and 22, a coupling connecting the inner end of shaft 21 with the tail-end of screw 11, this tail-end projecting tailwardly beyond nuts 19. The tailward end of shaft 21 is squared to receive a wrench or crank, preferably a ratchet wrench. By means of such wrench, the screw 11 may be turned and the table adjusted manually, assuming, of course, that the driving gearing is disconnected from the screw. Shaft 21 reaches well under the table and permits of screw 11 being no longer than the traverse of the table calls for.

Proceeding with the drawings and giving consideration for the present to Figs. 5 to 12 inclusive: 23, indicates a gear fast on the head-end of screw 11; 24, a countershaft carrying the reversing bevel-gears of the screw reversing mechanism, these bevel-gears being, as before stated, driven in opposite directions by a bevel pinion rotated by motor 13; 25, the clutch usually employed in connection with the reversing gearing of the bevel-geared type for connecting the bevel-gears alternatively with the shaft which they are to drive, the bevel-gears in the present instance being mounted on countershaft 24; 26, a pinion fast on countershaft 24 and engaging pinion 23 on the main screw of the planer; 27, the usual pivoted fork for shifting clutch 25; 28, a rock shaft mounted at the head-end of the bed; 29, an arm fast on this rock-shaft and engaging a spool fast on shipper-rod 14 so that the shaft will be oscillated as the shipper-rod is reciprocated by the movements of the table; 30, the shaft of fork 27; 31, a second arm on shaft 28; 32, an arm fast on shaft 30 of the reversing fork; 33, a link connecting arms 31 and 32; 34, a conical ended spring-plunger carried by arm 32; and 35, a triangular block fixedly supported by the machine and adapted to coöperate with spring-plunger 34. The reversing parts which have been referred to are not essentially different from the reversing parts employed in metal planers and other machines having a reciprocating part operated by a screw, the object of the spring-plunger being to insure the complete throwing of the reversing clutch when the table shall have thrown it part way. While the movement of the table or other reciprocating parts in analogous machines, may disconnect the clutch, the operating power is thereby cut off and the momentum of the reciprocating part may or may not be sufficient to throw the clutch to the reversing position. The device illustrated in Fig. 11 is a well known expedient for causing the completion of the throwing of the clutch the instant it shall have been thrown past the neutral position.

Proceeding with the drawings, with particular attention to Fig. 9: 36, indicates a sliding rod axially disposed in the outer end of countershaft 24 and having its inner end provided with a cross-pin engaging reversing clutch 25, this rod being provided with a spool on its outer end: 37, a hand-lever mounted on a pivot supported by the frame of the machine: 38, a bracket carrying the pivot on which lever 37 is mounted: 39, the forked end of hand-lever 37, engaging the spool of clutch-rod 36: 40, a removable pin engaging a hole in hand-lever 37 and a hole in bracket 38 and adapted to hold the hand-lever in neutral position: 41, a second removable pin in hand-lever 37: and 42, a pair of holes in bracket 38 adapted to receive pin 41 and to hold hand-lever 37 in one or the other of its extremes of motion with the clutch in neutral position, or disengaged from either bevel-gear. With hand-lever 37 in the position indicated in Fig. 9, and held in that position by the pin 40, the hand-lever is without office, and the shipper-rod 14 may be shifted in either direction by means of the dog on the table or by means of handle 17. But if pin 40 be removed from the hand-lever and the hand-lever be shifted to the left and pin 41 be put in the lefthand one of holes 42 it will, in connection with spring-plunger 34, cause the clutch to be held in such neutral position that it will engage neither one of the bevel-gears, and the same would be the case if the hand-lever was shifted to the right and pin 41 put in the other one of holes 42.

Proceeding with the drawings, with particular attention to Fig. 14: 43, indicates a pair of fixed housings secured to the bed, one at each side of the table: 44, a similar pair of housings nearer the tail end of the machine, this pair of housings being arranged to slide upon and be secured to the bed at various points in its length or, in other words, adjustable to and from the housings 43: 45, screws disposed lengthwise of the bed and having threaded engagement with the adjustable housings: 46, (Fig. 5) a cross-shaft bevel-geared to the tail ends of screws 45, and adapted to be manually turned to adjust the two housings 44 to and from the housings 43: 47, a rail, herein termed the long rail, extending across over the table at some distance above it and supported by the fixed housings: 48, a similar, but shorter rail, supported by the adjustable housings: 49, elevating screws having their upper ends secured to the rails and each passing down through a pair of lugs extending from the housings: 50, a nut on each of these elevating screws and disposed in the spaces between the lugs through which the screws pass: 51, a concave washer engaged by each nut and seating on the lower lug of each pair through which the screws pass: 52, beveled engaging surfaces on the bases of the rails and on the tops of the housings, serving to give the rails an accurate seating fit upon the tops of the housings without depending upon the closeness of fitting of the elevating screws within the lugs carried by the housings: and 53, elevating blocks adapted to fit between the rails and housings when the rails are elevated, the tops and bottoms of these blocks having tapering engaging surfaces to engage the tapering surfaces 52 of the rails and housings. The rails support saddles sliding transversely of the bed, and the saddles support vertical spindles to do the grinding work. If the rails were originally disposed at such height above the table as to permit the grinding wheels upon the lower ends of the spindles to operate upon deep work, no elevation of the rails would be needed. But, in such case, if the work to be dealt with had a considerable range of vertical depth the lower ends of the grinding spindles would have such an extent of downward projection, even when operating upon shallow work, as would be undesirable. For this reason provision is made for raising the rails for exceptionally deep work. Normally, the rails rest solidly down upon their housings and are accurately positioned upon the beveled engaging surfaces 52 on the rails and housings and are clamped down firmly to position by the nuts 50 engaging up under the upper lugs through which the elevating screws pass. If the rails are to be elevated then the nuts 50 are loosened and screwed down against the washers 51 and then operated, in an obvious manner, until the rails are elevated a sufficient distance. The blocks 53 are then inserted in the gaps between the rails and housings and the rails are lowered upon the blocks and the nuts 50 are again raised to engage the upper lugs of the housings to serve in clamping the rails down solidly to the blocks and the blocks down solidly to the housings, the beveled engaging surfaces of the blocks coöperating with those of the rails and housings to accurately position the rails the same as if the rails were clamped directly upon the housings. The blocks 53 may be of various heights, suited to demands, and there may be a proper number of blocks of different heights so that the rails may be clamped to the housings at an extra elevation corresponding with the thickness of one set of blocks, or at an extra elevation corresponding with a thicker set of blocks, or at an extra elevation corresponding with the aggregate thickness of one or more sets of blocks employed conjointly.

There is certain feeding mechanism for the saddles of the long rail 47, some of this feeding mechanism being operated by the movement of the table. This mechanism, so far as its connection with the table is concerned, will now be described, attention being called particularly to Figs. 5, 6 and 8 of the drawings:

Proceeding with the drawings (Figs. 5, 6 and 8): 54, indicates a vertical telescopic feed-shaft disposed outside one of the fixed housings and having its upper end connected with certain feed-mechanism on the long rail, the lower portion of this shaft fitting in a suitable bearing on the bed: 55, an arm splined on this shaft and supported by the bed: 55$^a$, a tappet-rod supported by the bed at the side of the table opposite the main shipper-rod 14: 56, a dog carried by the table and sliding on this tappet-rod: 57, a pair of adjustable tappets carried by the rod and adapted to be engaged by the dog: 58, a lever pivoted on the bed and having its inner end in engagement with a spool fast on the tappet-rod: and 59, a link connecting the outer end of lever 58 with arm 55. The tappets 57 will be adjusted and secured upon the tappet-rod at distances apart corresponding with the length of the work. When the table, in its reciprocations, approaches one end of its stroke, it will move the tappet-rod in one direction and, in an obvious manner, bring about an oscillation, in one direction, of vertical feed-shaft 54 and thereby transmit certain effects to the feed mechanism in the long rail, and when the table approaches the opposite extremity of its stroke, the vertical feed-shaft will be oscillated in the other direction. Under ordinary circumstances the vertical feed-shaft need not change its effective length, but when the rails are elevated the splined character of this shaft in its connection with arm 55 provides for such elevation.

Without at this stage going into details of the active instrumentalities of the machine, or of their actuating mechanisms, it is thought well to now describe in general terms, the grinding heads in their relation to each other and to the table.

Proceeding with the drawings, with principal reference to Figs. 14 and 18: 60, indicates a saddle sliding on short rail 48: 61, a saddle sliding on long rail 47: 62, an auxiliary saddle sliding on the long rail: 63, a vertical grinding spindle carried by saddle 60, this spindle having a grinding wheel at its lower end: 64, a similar spindle mounted in saddle 61: 65, a similar spindle mounted in saddle 62: 66, the grinding-head represented, in part, by saddle 61 and its grinding spindle 64: 67, the grinding-head represented by saddle 62 and its grinding spindle 65: and 68, the grinding-head represented by saddle 60 and its spindle 63. Assume a safe-door, such as illustrated by Figs. 2 and 3, as being secured to the table of the machine, ready for the operation of grinding its stepped and beveled margins and the rounding of the corners. Assuming that the side edges of the door are to be ground first, which is the preferable practice, short rail 48 is to be adjusted to position out of the way. Grinding-heads 66 and 67 are to be moved on the long rail so that their grinding wheels may straddle the door. The spindles of these grinding-heads are now to be lowered till their grinding wheels are in position to be brought inward to the door and engage the door in such manner that the circumference of the wheels may act at the top of the first step of the door. The table is now to be started into motion and the dogs on the shipper-rod adjusted so that the strokes of the table will be of such length as to cause the door to travel its entire length between the two grinding-wheels.

The grinding-heads are now to be moved inwardly so that the wheels may act upon the door. At each trip of the door past the grinding-wheels the grinding-heads are to be adjusted inwardly to permit the wheels to cut still deeper. When nearly the proper depth of grinding has been effected by the wheels then they are lowered and the grinding operation repeated on the next lower portion of the upper step of the door margin, and so on until both the side margins of the door have been ground to approximate dimension. The grinding-wheels, having been properly separated and adjusted vertically, are now fed inwardly to grind the shoulders of the steps. Thus far, the feeding of the wheels to the work has been by inward feeding motion. The wheels are now to be elevated and properly adjusted inwardly and fed downwardly on the first step to take a light smooth finishing cut, and, similarly, with the other steps of the side edges of the door. This completes the grinding of the side edges of the door. The table is now to be stopped and adjusted endwise to bring the door to such position that the wheel of grinding head 66 may operate upon the righthand end of the door, and grinding-head 67 is to be adjusted outwardly to a position out of the way. Short rail 48 is now to be adjusted toward the long rail in such manner that the wheel of grinding-head 68 may operate upon the lefthand end of the door. Grinding-heads 68 and 66 are now to be reciprocated upon their rails and the end margins of the door are to be ground in substantially the same manner as the side margins were ground. Grinding-head 66 is now to be adjusted along its rail to such position that its wheel, if swung around in a quarter circle, will round one of the corners of the door at its righthand end, and this grinding-head is then to be shifted so as to round the other corner at the righthand end. Similarly, grinding-head 68 is to be adjusted upon its rail to such position that its wheel may round first one corner and then the other corner of the lefthand end of the door. Both side edges of the door may be operated upon simultaneously, and both end edges of the door may be operated upon simultaneously, and a corner at one and the other end of the door may be rounded simultaneously.

In doing the grinding, which has been mentioned as being done first upon the upper step, it is immaterial which of the steps is ground first. The size of the grinding-wheels for working on the door is immaterial, but in grinding the steps of the jamb the wheels employed in rounding the corners must have no greater radius than the least radius of the jamb-corner to be ground. In grinding the door it is preferable practice to grind the sides and ends and then round the corners, while in grinding the jamb it is preferable practice to first grind the corners and then grind the straight work. It has been assumed that the grinding-wheels, in finishing the surfaces, had a vertical motion, but as the steps of the door and jamb are beveled it follows that the axes of the wheels must be tilted in accordance with the desired bevels. It will therefore be apprehended that the grinding-heads must be provided with facilities for feeding the wheels inwardly as the grinding progresses; that the grinding-spindles must be capable of tilting to suit the desired bevel of the work; that the grinding-heads must have provision for swinging the grinding-spindles in an arc in rounding the corners; and that, in addition to the provision for reciprocating the table, provision must be made for reciprocating grinding-heads 68 and 66. While grinding-head 67 might, of course, be similar to grinding-heads 68 and 66, it need not be called upon to perform any corner-rounding office and may therefore be of simpler and more economical construction.

Details of one of the grinding-heads will now be described:—

Proceeding with the drawings, with particular reference to Figs, 19, 20 and 21: 69, indicates a large circular bearing in saddle 60, the axis of this bearing being vertical: 70, a screw mounted on each rail and engaging nuts on saddles 60 and 61, to serve in moving the saddles along the rails: 71, splined rods journaled in the rails: 71ª, a drum mounted for rotation in the bearing 69 of the saddle and capable of turning therein through an angle in excess of ninety degrees: 72, a worm splined on rod 71: 73, a worm-gear carried by the drum and engaged by worm 72: 74, a horizontal guideway formed within the drum: 75, a slide fitting this guideway and capable of shifting diametrically across the drum: 76, a vertical sleeve fitting within this slide and capable of tilting motion therein: 77, trunnions connecting this sleeve with the slide and forming the axis of the tilting motion of the sleeve: 78, a hollow spindle-bar fitted to slide vertically in the sleeve: 79, a key carried by the sleeve and engaging a longitudinal keyway in the spindle-bar to prevent the spindle-bar from turning in the sleeve: 80, a nut, with its axis horizontal, fixed to the top of slide 75: 81, trunnions on the sides of sleeve 76 above the level of the top of the drum, their common axis being parallel with the common axis of trunnions 77: 82, a yoke fitted to slide on the top of slide 75 and having engagement with trunnions 81: 83, a tilting-screw threaded in nut 80 and having its inner end in engagement with yoke 82: 84, a motor-supporting plate secured to the upper end of spindle-bar 78: 85, an electric motor secured to this plate and having the axis of its armature-shaft disposed vertically and eccentrical to the spindle-bar and the spindle 63 journaled therein: 86, an internal gear fast on the armature-shaft of the motor: 87, a pinion fast on grinding-spindle 63 and meshing with the internal gear: 88, ball-bearings disposed within the spindle-bar and engaged by the spindle: and 89, the grinding-wheel on the lower end of the spindle. By means of the eccentric gear arrangement, the motor drives the grinding-spindle at a speed in excess of that of the armature and the arrangement is of such a compact nature as to permit of the satisfactory mounting of the motor upon the upper end of the spindle-bar. Screw 70 serves in feeding the saddle along the rail when straight grinding is being done as when grinding the lefthand end of a safe-door or jamb, the expression "lefthand" being used as referring to Fig. 18. By adjusting slide 75 across the drum the grinding-wheel may be brought to its work and, after it has taken a cut, it may be adjusted farther inwardly for a new cut. This movement of the parts will be referred to as the "infeed." By raising and lowering the spindle-bar the grinding-wheel may be caused to work at higher or lower levels. Sleeve 76 as illustrated in Fig. 19 as being vertical, resulting in the axis of the grinding-spindle and wheel being vertical. If, now, tilting screw 83 be operated, the sleeve and spindle will be tilted out of the vertical so that the grinding of beveled surfaces, such as the beveled steps of a safe-door or jamb, may be effected. If the grinding-head be so adjusted, relative to the work in hand, that the axis of the drum will correspond with the center of the curves at a corner of a safe-door, and then the slide be adjusted properly across the drum, and then the drum be given a rotary motion, first one way and then the other, the wheel will round the corner of the work being operated upon. The infeed above referred to will take place when rounding the corners of the work the same as when grinding straight work and, as will be later explained, the infeed takes place regardless of whether the spindle be truly vertical or be tilted for grinding beveled surfaces.

Explanation will now be made of the means for vertically feeding the spindle and grinding-wheel of grinding-head 68, and it may be incidentally remarked that while the explanation will be made with reference to grinding-head 68 the same explanation will apply to the other two grinding-heads.

Proceeding with the drawings, and giving particular attention to Fig. 19, and Figs. 22 to 25 inclusive: 90, indicates a vertical screw disposed alongside spindle-bar 78 and having its upper end fixed in motor-supporting plate 84: 91, a rotary nut journaled in the upper end of sleeve 76: 92, a worm-gear fast on this nut: 93, a horizontal shaft journaled in the sleeve at the level of the worm-gear: 94, a worm fast on this shaft and engaging the worm-gear: and 95, a hand-wheel fast on this shaft. Disregarding further refinements, by turning the hand-wheel the nut is turned on its screw and the spindle-bar with its spindle and grinding-wheel may be moved up and down by hand through tilting-sleeve 76, the rapidity of the vertical movement of these parts being dependent on the rate of turning of the hand-wheel, which would be slow for vertical feeding operations and rapid for the vertical fleeting of the grinding-wheel.

Proceeding with the drawings: 96, indicates a worm-gear loose on shaft 93: 97, a spiral gear loose on this shaft, these two gears being separated from each other and each being provided with a clutch-hub: 98, a sliding-clutch mounted on shaft 93 and adapted to be moved axially to lock either the worm-gear or the spiral-gear to shaft 93: 99, a hand-pin disposed axially in shaft 93 and attached to the sliding clutch and adapted to serve in placing the clutch in neutral position or in connection with either of its coöperating gears: 100, a horizontal worm-shaft journaled in a housing carried by the upper end of the sleeve, this worm-shaft being in the plane of worm-gear 96: 101, a worm fast on this worm-shaft and engaging worm-gear 96: 102, a similar horizontal shaft journaled above spiral gear 97: 103, a spiral-gear fast on shaft 102 and engaging spiral-gear 97: 104, an electric motor suitably mounted on the upper end of sleeve 76: and 105, gearing connecting the armature-shaft of this motor with the two shafts 100 and 102.

When clutch 98 is in neutral position, as illustrated in Fig. 23, the spindle-bar with the parts carried by it, may be raised and lowered by hand, as has been before explained. Assume motor 104 to be in motion, if the clutch be thrown to worm-gear 96 then the vertical motion of the spindle-bar and the parts carried by it, will be imparted to it by power and give to the grinding-wheel a rate of vertical feeding motion dependent on the proportion of the worm-gearing which brings about this motion, and in a direction dependent on the direction of motion of the motor, which should be a reversing motor and also, preferably, a variable speed motor. If, now, the clutch be disconnected from the worm-gear and thrown to spiral-gear 97 then the spindle-bar and grinding-wheel will obviously be given a much more rapid vertical motion. It is thus seen that the spindle-bar may be raised or lowered by hand at such rate of speed as is practicable and that it may be raised and lowered by power at a comparatively slow rate of speed suited to feeding, and that it may be raised and lowered by power at a much more rapid rate of speed, for fleeting purposes.

The infeeding devices, so far as they are directly connected with the slide 76, will now be explained, reference being had principally to Figs. 26, 27 and 28 of the drawings. In these figures of the drawings: 106 indicates a nut fixed at one side of the slide: 107, a bearing carried by the drum in alinement with the nut: 108, a screw threaded into the nut and journaled and held against endwise movement in bearing 107: 109, a worm-gear fast on the screw: 110, a duplicate of the parts thus far just described but located lower down on the slide: 111, worm-shaft journaled vertically in the drum: 112, a pair of worms fast with worm-shaft 111 and engaging the two worm-gears on the screws: and 113, a ratchet on the lower end of the worm-shaft. If the worm-shaft, through the medium of ratchet 113, be given intermittent rotary motion, the two screws will be turned and slide 75 will, in an obvious manner, be moved radially of the drum. This radial movement of the slide constitutes the infeed for the grinding-wheel and mechanism will be later described for giving the intermittent motion in one direction or the other to the worm-shaft, it being understood, of course, that the infeed employed in feeding the grinding-wheel inward in grinding the exterior margin of such an article as a safe door, will become an outfeed when grinding an interior margin such as a safe door jamb. The two screws 108 illustrated are not essential in giving to the slide its radial motion in the drawing but they are of practical advantage in equalizing the strains at the upper and lower portions of the slide.

Explanation will now be made of the mechanism immediately connected with the ratchet 113 for turning it in producing the infeed, and in this connection it is to be understood that this mechanism is the same at the three grinding-heads, notwithstanding the fact that the auxiliary grinding-head of the long rail does not need to be provided with a rotary drum to be employed in rounding corners.

Proceeding with the drawings, and giving consideration to Figs. 29 to 33 inclusive: 114, indicates a pair of brackets secured to the under side of drum 71ª: 115, a short rod, so to call it, splined in and arranged to slide horizontally in these brackets, underneath the ratchet 113: 116, a pawl-carrier adjustably clamped to this short rod and extending to each side thereof at one side of the ratchet 113: 117, a similar pawl-carrier adjustably clamped to this short rod at the opposite side of ratchet 113: 118, a pair of inwardly reaching spring pawls pivoted to each pawl-carrier and adapted to have their toes engage the ratchet: 119, the pivots of the pawls, these pivots being fixed in the pawl-carriers: 120, a pawl locking-rod extending across each pawl-carrier and through the pawl-pivots of that pawl-carrier and through the hubs of the pawls mounted on those pivots: and 121, a handle by means of which this locking-rod may be shifted endwise. If short rod 115 be reciprocated with reference to the ratchet-wheel, by any means whatever, it will result in the intermittent rotation of the ratchet. In Fig. 29 it is to be observed that the lower pawl at the right is out of action and that the upper pawl at the left is out of action, and locked so by mechanism to be later explained. The reciprocations of the short rod 115 will manifestly bring about the step by step rotation of the ratchet in counter-clockwise direction. If, now, the before-mentioned active pawls are locked out of action and the other two pawls are permitted to go into action, then the reciprocations of short rod 115 will bring about the intermittent advance of the ratchet in clockwise direction. And it will also be apprehended that the reciprocations of the short rod and the consequent actuation of the ratchet can be effected either by moving the short rod endwise, first in one direction and then in the other, by a moving force extraneously applied or by causing the short rod to move endwise and be arrested in its movement by having one or the other of its ends come in contact with some relatively fixed abutment. This intermittent advance of the ratchet will manifestly bring about the movement of slide 76 in its guideways and produce the desired infeed movement of the slide and the parts carried by it. Provision is made for locking the heretofore-mentioned pair of pawls out of action and permitting the other pair of pawls to go into action. Looking at Fig. 31 it is to be observed that the upper end of rod 120 passes through a segmental slot in the hub of the upper pawl as well as passing through the pivot on which that pawl is mounted. This upper pawl is therefore free to act in the usual pawl-like manner. This represents the condition of the upper righthand pawl in Fig. 29. If, now, this pawl be lifted free of the ratchet and rod 120 be shifted endwise through the pivot of the pawl, it may enter a hole in the hub of this pawl and thus lock the pawl in idle position.

In Fig. 31, as well as in Fig. 29, the locking-rod is in such position as to lock the lower pawl out of action while permitting the upper pawl to be active, and the upward shifting of locking-rod 120 to proper extent will not only lock the upper pawl out of action but will unlock the lower pawl and permit it to go into action on the ratchet. This control of the two pairs of pawls is to be effected when it is desired to produce a change in the direction of the angular advance of the ratchet. Instead of so shifting the locking rod as to unlock one pawl and lock the other pawl, the locking-rod may be shifted to such intermediate position as will lock the previously active pawl to idleness without unlocking the previously idle pawl. When all the pawls are thus locked in idle position then reciprocations of short rod 115 will have no effect whatever upon the ratchet, which is now free to remain stationary, or to be turned by hand-mechanism now to be described.

Proceeding with the drawings, particularly Figs. 29, 30 and 32: 122, indicates a hand-lever pivoted on the axis of the ratchet: 123, a downwardly projecting handle on the outer end thereof: 124, a spring-plunger disposed in the hand-lever and having at its inner end a tooth adapted to engage the teeth of the ratchet, the spring of the plunger holding the tooth normally out of engagement with the ratchet: and 125, a finger-lever mounted on the hand-lever contiguous to its handle and serving as means by which the plunger may be pressed inwardly against the resistance of its spring so that the toe of the plunger may engage the ratchet. The four pawls being locked out of action, the ratchet may be turned by means of the hand-lever when the tooth of the plunger has been moved into position engaging the ratchet, thus permitting the ratchet to be turned by hand in either direction. It is to be observed that the ratchet 113 has a broad face, the pawls engaging the lower portion of the face while the tooth of the hand-lever is to engage only the upper portion of the face of the ratchet, the pawls thus not interfering with a rather liberal sweep of the hand-lever. It is to be understood that, in grinding the surfaces lengthwise of the work, the table moves the work endwise between the two grinding-wheels carried by the long rail, the infeed of the grinding-wheels being derived from the motion of the table. Description has heretofore been given, in connection with Figs. 5, 6, 8 and 14, or such of this infeed mechanism as is immediately acted upon by the table, and it will be remembered that the reciprocations of the table brought about oscillations of vertical feed-shaft 54, whose upper end was to transmit certain effects to the feeding mechanism of the long rail, and it has been explained that reciprocations of short rods 115 will bring about intermittent advances of the ratchets 113 and thereby effect the infeed of the grinding-wheels to which those ratchets pertained. Explanation will now be made as to how the oscillations of the vertical feed-shaft 54 produce reciprocations of the short rods 115.

Proceeding with the drawings, and referring particularly to Figs. 34, 35 and 36: 126, indicates a reciprocating rod mounted under the long rail parallel with short rods 115 of the grinding-heads of that rail: 127, bearings carried by the rail for the support of this rod: 128, an arm fast on the upper end of the vertical feed-shaft 54 and coupled to rod 126, which rod 126 will be called the long rod: and 129, clamps engaging the long rod and the two short rods of the long rail and causing the short rods to reciprocate in unison with the long rods. At each end of each stroke of the table the long rod is shifted endwise and shifts the short rods endwise, thus bringing about an infeeding motion for the slides of the two grinding-heads carried by the long rail. When the work has been placed upon the table, the grinding-heads of the long rail having been sufficiently separated, those grinding-heads are adjusted inwardly, in a general manner, as hereinafter explained, until the two grinding-wheels are about in position to do grinding on the sides of the work. Then, as the table reciprocates the work between the grinding-wheels, the infeed of the wheels is effected automatically by the reciprocations of the long rod, or, if the infeed pawls be put to idle position, by the manipulation of hand-levers 122.

Referring, for the moment, to Fig. 29, if the pawl-carriers 116 and 117 be secured in selective positions along their short rods, the degree of infeed will be varied while the short rods are given a constant extent of reciprocation. The clamping of the long rod to the short rods is to be effected after the two grinding-heads have been given their general location for beginning the grinding on the sides of the work. The infeeding motion, as derived from the reciprocations of the table, are manifestly not available in grinding the ends of the work, or in rounding the corners of the work, and when this end grinding or corner rounding is to be done then the long rod is to be disconnected from the saddles of the long rail and entirely removed. The two grinding-heads carried by the long rail are to be employed in grinding the sides of the work carried between their grinding-wheels by the reciprocations of the table. When the ends of the work or the round corners of the work are to be dealt with then the auxiliary grinding-head 62 is drawn back to idle position in the end of the long rail.

Continuing with the drawings, and giving attention to Figs. 18 and 34: 130, indicates a nut carried by auxiliary saddle 62: 131, a screw journaled in a bearing carried by the long rail, and threaded into nut; 130: and 132, a hand-wheel on the outer end of this screw. By means of the hand-wheel and its screw the auxiliary saddle may be adjusted inwardly to bring its grinding wheel into position to do grinding along one side of the work, the infeeding of this grinding-wheel being later accomplished through the medium of reciprocating rod 126 as has been heretofore explained. When the side grinding is completed then rod 126 is to be disconnected and removed, as has been stated, and, by means of screw 131, the auxiliary saddle with the parts carried by it, are to be moved outwardly to idle position so that the saddle 61 on the long rail is free to move crosswise of the table, for the purpose of grinding its end of the work, and free to take positions appropriate to the grinding of the corners at the end of the work on which the wheel is carried and saddle 61 has operated. In grinding the ends of the work, the table and the work carried by it will be stationary and the grinding-wheel carried by the saddle 61 on the long rail will be reciprocated lengthwise of the rail by means of screw 70 of that rail (Fig. 18), the mechanism for operating this screw to be later explained. When corners are to be rounded by the grinding-wheel carried by saddle 61, then the rotary drum of that saddle is to be rotated, as heretofore explained, through the medium of splined rod 71 of the long rail, the means for rotating the splined rod being later explained.

Continuing with the drawings, and giving special attention to Figs. 37 and 39: 133, indicates longitudinal T slots in the base of the long rail: 134, a dog adjustable along one of these slots and presenting a beveled inner surface adapted to be engaged by one end of short rod 115 as the saddle slides in the rail: and 135, a similar dog adjustable in the opposite T-slot. As the parts appear in Fig. 37 the short rod is in the rightward position and it is to be assumed that the saddle is moving toward dog 134. When the righthand end of the short rod travels along this dog the short rod will be pushed to the left, thus producing an infeeding impulse for the grinding-wheel. When the saddle reverses its direction of motion the short rod will reach and travel upon dog 135 and another infeeding impulse will be given to the grinding-wheel. It is thus seen that at each end of the travel of the saddle an infeeding impulse will be given to the grinding-wheel. The dogs will be secured in such positions along the rail as are appropriate to the width of the work being ground. The dogs may be adjusted to entirely idle positions and the infeeding produced by hand, as has been heretofore explained.

Proceeding with the drawings, and giving particular attention to Figs. 38 and 40: 136, indicates an arc through which the axis if the grinding-wheel is to swing in rounding a certain corner by means of the grinding-wheel carried by spindle 64, this arc being necessarily limited to a quarter circle in rounding exterior corners: 137, a downwardly projecting dog secured to the base of saddle 61 in position to be engaged by an end of short rod 115 as the rotating drum nears the end of its quarter turn: 138, a similar dog to be engaged by the end of the short rod when the saddle is shifted along the rail for dealing with a second corner of the work: 139, an arc through which the axis of the grinding-wheel is to swing in rounding the second corner; and 140, the position which dog 138 will occupy when the saddle has been shifted along the rail for operation upon the second corner of the work. In Fig. 38 assume the drum to be turning in clockwise direction. As the drum approaches the end of its quarter turn one end of short rod 115 will engage dog 134 and the rod will be pushed endwise, thus giving an infeeding impulse to the grinding-wheel. When the rotary motion of the drum reverses, by means to be later explained, the lefthand end of the short rod will engage dog 137 as the drum approaches the end of its quarter turn, thus giving another infeeding impulse to the grinding-wheel. In this infeeding operation dogs 135 and 138 are without office. When the other corner at the long rail, indicated by curve 139, is to be rounded, then the saddle is to be appropriately shifted along the rail, whereupon dogs 134 and 137 become abandoned, and the reciprocations of the short rod will be brought about by its contact with dogs 135 and 138, dog 138 being brought to the position 140 by the adjustment of the saddle along the rail, and dog 135 having been appropriately adjusted. In this manner the drum-provided grinding-head of the long rail may round the opposite corners at one end of the work, the dogs 134 and 135 being appropriately adjusted, and, if desired, all the dogs for producing the infeed in rounding corners may be abandoned and the infeed produced by hand by means of the mechanism which has been explained. It is to be here stated that while explanation has been devoted to the drum-provided grinding-head of the long rail, the grinding-head on the short rail is of the same construction and mode of operation, the only difference between the two rails being that the long rail is provided with an auxiliary grinding-head for operating on one side of the work reciprocated by the table, this auxiliary grinding-head being retreated, as before explained, to entirely idle position when the ends or corners of the work are being dealt with. The drum-provided grinding-head on the long rail grinds one end of the work and rounds the corners at that end of the work, while the grinding-head on the short rail grinds the opposite end of the work and rounds its corners.

It is now in order to explain the mechanism by means of which the drum-provided grinding-heads may be given their reciprocating motion along their rails for grinding the ends of the work, and the mechanism by means of which the drums are given their rotary motion in rounding corners.

Proceeding with the drawings, and giving particular attention to Figs. 41 and 42: 141 indicates an end of rail-screw 70 projecting from the end of the rail and squared at its extreme outer end for the reception of a handle, preferably a ratchet wrench: 142 a similar extension on the end of the splined rod: 143 reversing mechanisms mounted on the ends of the splined rod and screw: 144, a short driving-shaft for the driving bevel-gear on the reversing mechanism of the splined rod: 145 a similar short shaft pertaining to the reversing mechanism of the screw: 146 a spur-gear on shaft 145: 147 a spur-gear on shaft 144, the two shafts 144 and 145 being in substantial alinement with each other, and the spur-gears 146 and 147 being separated from each other to an extent greater than their width: 148 a countershaft mounted at the end of the rail parallel with shafts 144 and 145: 149 a pinion splined on the countershaft and adapted to slide into engagement with either gear 146 or 147: 150 hand-mechanism for sliding the pinion 149 and holding it in neutral position or in engagement with either of the gears 146 or 147: 151 a spur-gear fast on the countershaft: 152 a motor mounted at the end of the rail: 153 a pinion fast on the armature-shaft of the motor: 154 an idle gear connecting motor-pinion 153 with gear 151: 155 a shipper-rod disposed lengthwise of the rail near screw 70: 156 a handle on the outer end of this rod: 157 a spool fast on this rod: 158 a lever connecting this spool with the forked lever of the reversing mechanism of the screw: 159 a shipper-rod disposed along the rail near splined rod 71 and provided with a handle, and spool and lever connecting it with the forked lever of the reversing mechanism of the spined rod: and 160 bearings carried by the rail for the support of the two shipper-rods 155 and 159. Assuming the sliding pinion to have been adjusted to such position that it will be driving the rail-screw in a given direction, a proper endwise movement of shipper-rod 155, by means of its handle or otherwise, will reverse the direction of the screw and, as the screw engages a nut on the saddle, will reverse the direction of the travel of the saddle along the rail. Details of the reversing mechanism of the screw or the splined rod have not been gone into, it being sufficient to say that the general construction and mode of operation of these driving and reversing mechanisms is substantially the same as that employed in driving and reversing the motion of screw 11 which operates the table, as has been heretofore fully explained. The rotation of the splined rod in one direction or the other direction brings about the rotation of the drum in the saddle as has been before explained. The sliding pinion on the countershaft can connect the motor with the reversing gearing of the rail-screw or with the reversing gearing of the splined rod, selectively. If the motor is driving the splined rod in one direction of its motion the drum will be turned in its saddle in corresponding direction, and if shipper-rod 47 be properly moved endwise, by means of its handle, or otherwise, the motion of the splined rod and the drum will be reversed.

It now remains to be explained how the shipper-rods of the rails are automatically reciprocated by the saddles and their drums.

Continuing with the drawings and giving particular consideration to Fig. 45: 161, indicates a pair of adjustable tappets secured to shipper-rod 155: and 162, a dog carried by the saddle and adapted, as the saddle reciprocates on the rail, to make contact with the tappets 161.

The motor having been connected with the rail-screw, in the manner heretofore explained, the rail-screw turns and moves the saddle along the rail. When the saddle-dog 162 makes contact with one of the tappets 161 the shipper-rod is moved endwise and the direction of motion of the screw and saddle is reversed in an obvious manner. Independently of the tappets the shipper-rod may at any time be operated by hand to bring about the reversals of motion of the saddle, and, independent of the motor and shipper-rod the screw may be turned by hand to adjust the saddle along the rail.

Continuing with Fig. 45 of the drawings: 163, indicates an adjustable tappet secured to the shipper-rod 159 pertaining to the splined rod of the rail, this tappet projecting over the saddle so as to be within reach of dogs carried by the drum: 164, a dog carried by the drum and adapted, as the drum turns, to make contact with one side of this tappet: 165, a second similar dog carried by the drum and adapted to make contact with the other side of the tappet: and 166, a third similar dog carried by the drum. Assume that the saddle is stationary and that the motor has been put to the splined rod and turns the drum in clockwise direction. When dog 164 strikes the tappet the angular motion of the drum will be reversed, in an obvious manner, whereupon dog 165 will eventually be brought into contact with the tappet and again reverse the angular motion of the drum. In rounding exterior corners on work, the angular motion of the drum is to be reversed at each quarter turn. In rounding interior corners on the work no harm is done if this angular motion of the drum exceeds a quarter turn. The dogs on the drum are angularly adjustable thereon so as to secure proper accuracy of reversal. Dogs 164 and 165 are employed in rounding one corner of the work, the tappet having position between these two dogs. When the opposite corner of the work is to be rounded then the drum will be adjusted to such position that the tappet will lie between and be operated by dogs 164 and 166, dog 165 becoming idle. The angular motion of the drum may be reversed by shifting shipper-rod 159 by hand, and, independent of the motor, the splined rod may be turned by hand to angularly adjust the drum.

We claim:—

1. A grinding machine comprising in its mechanism, an adjustable saddle, a cylindrically bored sleeve carried by the saddle, a hollow spindle-bar carried by the sleeve and mounted for reciprocating motion relative thereto and provided with means to prevent its rotation, a grinding-spindle rotatable in the spindle-bar, mechanism for rotating the grinding-spindle, and mechanism for reciprocating the spindle-bar relative to the sleeve.

2. A grinding machine comprising in its mechanism, an adjustable saddle, a hollow spindle-bar carried by the saddle and mounted for reciprocating motion relative thereto and provided with means to prevent its rotation, a grinding-spindle rotatable in the spindle-bar, a pinion on the end of the spindle, an electric motor mounted on the spindle-bar with the axis of its armature-shaft parallel with the axis of the spindle and eccentric thereto, an internal gear carried by the armature-shaft and engaging the pinion, and mechanism for reciprocating the spindle-bar relative to the saddle, combined substantially as set forth.

3. A grinding machine comprising in its mechanism, an adjustable saddle, a hollow spindle-bar carried by the saddle and mounted for reciprocating motion relative thereto and provided with means to prevent its rotation, a grinding-spindle rotatable in the spindle-bar, mechanism for rotating the grinding-spindle, a screw fixed to and parallel with the spindle-bar, a rotary nut supported by the saddle and engaging said screw, and hand-operable mechanism supported by the saddle and adapted to serve in turning the nut upon the screw, combined substantially as set forth.

4. A grinding machine comprising in its mechanism, an adjustable saddle, a hollow spindle-bar carried by the saddle and mounted for reciprocating motion relative thereto and provided with means to prevent rotation, a grinding-spindle rotatable in the spindle-bar, mechanism for rotating the grinding-spindle, a screw fixed to and parallel with the spindle-bar, a rotary nut supported by the saddle and engaging said screw, a worm-gear formed on the nut, a worm-shaft supported by the saddle and provided with a worm engaging the worm-wheel, and a handle on the worm-shaft, combined substantially as set forth.

5. A grinding machine comprising in its mechanism, an adjustable saddle, a hollow spindle-bar carried by the saddle and mounted for reciprocating motion relative thereto and provided with means to prevent its rotation, a grinding-spindle rotatable in the spindle-bar, mechanism for rotating the grinding-spindle, a screw fixed parallel with the spindle-bar, a rotary nut supported by the saddle and engaging said screw, a worm-gear formed on the nut, a worm-shaft supported by the saddle and provided with a worm engaging the worm-wheel, a handle on the worm-shaft, a motor supported by the saddle, gearing connecting the motor idly with the worm-shaft, and a clutch serving to connect the gearing positively with the worm-shaft, combined substantially as set forth.

6. A grinding machine comprising in its mechanism, an adjustable saddle, a hollow spindle-bar carried by the saddle and mounted for reciprocating motion relative thereto and provided with means to prevent its rotation, a grinding-spindle rotatable in the spindle-bar, mechanism for rotating the grinding-spindle, a screw fixed parallel with the spindle-bar, a rotary nut supported by the saddle and engaging said screw, a worm-gear formed on the nut, a worm-shaft supported by the saddle and provided with a worm engaging the worm-wheel, a handle on the worm-shaft, a motor supported by the saddle, gearing connecting the motor idly with the worm-shaft, a clutch serving to connect the gearing positively with the worm-shaft, a second gearing connecting the motor idly with the worm-shaft and adapted for transmitting to the worm-shaft a rate of speed higher than that transmitted by the first-mentioned gearing, and clutch-mechanism adapted to serve in connecting the worm-shaft positively and selectively with either of the two gearings, combined substantially as set forth.

7. A grinding machine comprising in its mechanism, an adjustable saddle, a hollow spindle-bar carried by the saddle and mounted for reciprocating motion relative thereto and provided with means to prevent its rotation, a grinding-spindle rotatable in the spindle-bar, mechanism for rotating the grinding-spindle, a screw fixed parallel with the spindle-bar, a rotary nut supported by the saddle and engaging said screw, a worm-wheel on the nut, a worm-shaft provided with a worm engaging the nut, a handle on the worm-shaft, a worm-gear loose on the worm-shaft, a spiral gear loose on the worm-shaft, a clutch for locking the worm-shaft to either the worm-gear or the spiral gear, a pair of parallel shafts, a motor supported by the saddle, gearing connecting the motor with the parallel shafts, a spiral pinion on one of the parallel shafts and engaging the spiral gear on the worm-shaft, and a worm on the other parallel shaft engaging the worm-gear on the worm-shaft, combined substantially as set forth.

8. A grinding machine comprising in its mechanism an adjustable saddle, a tiltable sleeve supported thereby on trunnions and provided with a bearing for a spindle-bar, a hollow spindle-bar mounted for reciprocation in the bearing of the sleeve and provided with means to prevent its rotation, a grinding-spindle rotatable in the spindle-bar and reciprocating with it, mechanism for rotating the grinding-spindle, and means for tilting the sleeve upon its trunnions, combined substantially as set forth.

9. A grinding machine comprising in its mechanism, an adjustable saddle, a tiltable sleeve supported thereby on trunnions, a hollow spindle-bar mounted for reciprocation in the sleeve and provided with means to prevent its rotation, a grinding-spindle rotatable in the spindle-bar and reciprocating with it, mechanism for rotating the grinding-spindle, a sliding yoke supported by the saddle and connected with the sleeve, and a screw for shifting the yoke and tilting the sleeve, combined substantially as set forth.

10. A grinding machine comprising in its mechanism, an adjustable saddle, a guideway supported by the saddle, a slide fitting the guideway, a tiltable sleeve trunnioned in the slide, a spindle-bar fitted for reciprocation in the sleeve and provided with means to prevent its rotation, a grinding-spindle rotatable in the spindle-bar, mechanism for rotating the grinding-spindle, and means for reciprocating the spindle and for shifting the slide in the guideway, combined substantially as set forth.

11. A grinding machine comprising in its mechanism, an adjustable saddle having through it a cylindrical bearing, a drum mounted for angular adjustment in said bearing, a slide supported by the drum and adjustable diametrically across the same, a spindle-bar supported by the slide and mounted for reciprocating motion relative thereto and provided with means to prevent its rotation, a grinding-spindle rotatable in the spindle-bar, mechanism for rotating the grinding-spindle, and mechanism for angularly adjusting drum in the saddle, combined substantially as set forth.

12. A grinding machine comprising in its mechanism, an adjustable saddle having through it a cylindrical bearing, a drum mounted for angular adjustment in said bearing, a slide supported by the drum and adjustable diametrically across the same, a spindle-bar supported by the slide and mounted for reciprocating motion relative thereto and provided with means to prevent its rotation, a grinding-spindle rotatable in the spindle-bar, mechanism for rotating the grinding-spindle, a worm-gear on the drum, a rotatable rod supported by the saddle, and a worm carried by the rod and engaging the worm-gear of the drum, combined substantially as set forth.

13. A grinding machine comprising in its mechanism, a rail, a saddle adjustable along the rail, a slide mounted for movement relative to the saddle and rail, a nut carried by the slide, a screw supported by the saddle independent of the rail and engaging said nut, a worm-gear fast on the screw, a worm-shaft supported by the saddle independent of the rail, a ratchet on the worm-shaft, and mechanism supported by the saddle to serve in angularly adjusting the ratchet, combined substantially as set forth.

14. A grinding machine comprising in its mechanism, an adjustable saddle, a slide mounted for movement across the same, a ratchet supported by the saddle, mechanism connecting the ratchet and the slide for moving the latter, a handle mounted to oscillate on an axis coincident with that of the ratchet, a toothed plunger carried by the handle normally free from the ratchet, and a finger-lever associated with the handle and adapted to serve in connecting the tooth of the plunger operatively with the ratchet, combined substantially as set forth.

15. A grinding machine comprising in its mechanism, an adjustable saddle, a slide mounted for movement across the same, a ratchet supported by the saddle, mechanism connecting the ratchet and the slide for moving the latter, a rod supported by the saddle and reciprocatable across the ratchet, a pawl-carrier secured to the rod at one side of the periphery of the ratchet, a pair of spring pawls pivoted on the pawl-carrier and extending toward the ratchet and having toes adapted to engage the ratchet on opposite sides of its center, mechanism for reciprocating the rod, a locking device to serve in locking one of the pawls entirely free of the ratchet while leaving the other pawl at liberty to coöperate with the ratchet, and means for reciprocating said rod, combined substantially as set forth.

16. A grinding machine comprising in its mechanism, an adjustable saddle, a slide mounted for movement across the same, a ratchet supported by the saddle, mechanism connecting the ratchet and the slide for moving the latter, a rod supported by the saddle and reciprocatable across the ratchet, a pawl-carrier secured to the rod at one side of the periphery of the ratchet, a pair of spring pawls pivoted on the pawl-carrier and extending toward the ratchet and having toes adapted to engage the ratchet on opposite sides of its center, mechanism for reciprocating the rod, a locking device to serve in locking one of the pawls entirely free of the ratchet while leaving the other pawl at liberty to coöperate with the ratchet, a second pawl-carrier and pair of pawls and pawl-locking device secured to the rod at the opposite side of the periphery of the ratchet, and means for reciprocating said rod, combined substantially as set forth.

17. A grinding machine comprising in its mechanism, a ratchet whose angular motions are to bring about a feeding action, a reciprocating pawl-carrier near the ratchet, a pair of spring-pawls pivoted to the pawl-carrier and having toes adapted to engage the ratchet, and a locking-rod mounted to slide across in the pivots of the pawls and having its ends adapted to engage sockets in the pawls and lock one of the pawls to inactive position while permitting the other pawl to coöperate with the ratchet, combined substantially as set forth.

18. A grinding machine comprising in its mechanism, a ratchet whose angular motions are to bring about a feeding action, a reciprocating-rod having exposed ends, means for shifting the rod and ratchet in directions at right angles to the axis of the ratchet, and dogs adapted to be engaged by the ends of the rod to effect its reciprocations, combined substantially as set forth.

19. A grinding machine comprising in its mechanism, an adjustable saddle having through it a cylindrical bearing, a drum mounted for angular adjustment in said bearing, a slide movable across the drum, a ratchet carried by the drum, mechanism connecting the ratchet and slide to bring about a feeding motion of the slide, a rod reciprocating across the ratchet in bearings supported by the drum and having exposed ends, pawls carried by the rod and coöperating with the ratchet, and dogs carried by the saddle and adapted to be engaged by the ends of the rod, combined substantially as set forth.

20. A grinding machine comprising in its mechanism, a bed, a table to reciprocate thereon, a screw supported by the bed lengthwise of the table and serving for its reciprocations, mechanism disposed at one end of the bed for revolving the screw in one direction and the other, and a hand-operating shaft coupled to the end of the screw opposite its operating mechanism and journaled in the bed and projecting from the end of the bed opposite the screw-operating mechanism, combined substantially as set forth.

21. A grinding machine comprising in its mechanism, a bed, a table to reciprocate thereon and adapted to sustain a piece of work to be reciprocated along the bed, mechanism for reciprocating the table, vertical grinding spindles adjustably supported above the table, grinding-wheels carried by the grinding spindles and adapted to operate on the sides of work carried by the table, and means for adjusting the grinding spindles to and from each other, combined substantially as set forth.

22. A grinding machine comprising in its mechanism, a bed, a table to reciprocate thereon and adapted to sustain a piece of work to be reciprocated along the bed, mechanism for reciprocating the table, vertical grinding spindles adjustably supported above the table and mounted for movement across the path of motion of the table, grinding wheels carried by said spindles and adapted to operate on the ends of the work supported by the table while stationary, hand mechanism for adjusting the table upon the bed relative to the grinding wheels, and operative mechanism for traversing the grinding spindles across the table, combined substantially as set forth.

23. A grinding machine comprising in its mechanism, a bed, a table mounted to reciprocate thereon and adapted to sustain a piece of work to be reciprocated along the bed, a pair of vertical grinding-spindles adjustably supported above the table, grinding wheels carried by the spindles and adapted to operate on work supported by the table, bearings for the grinding spindles, and operative mechanism for swinging said bearings in curves corresponding with the curvature desired on the corners of the work supported by the table, combined substantially as set forth.

24. A grinding machine comprising in its mechanism, a bed, a table to reciprocate thereon, mechanism for reciprocating the table, a pair of vertical grinding spindles, grinding wheels carried by said spindles and adapted for operation on the sides of work reciprocated between them by the table, a third grinding-spindle, a grinding-wheel carried by the last-mentioned spindle, and operative means for moving the last-mentioned spindle and one of the first-mentioned spindles across the table while the table is at rest, combined substantially as set forth.

25. A grinding machine comprising in its mechanism, a bed, a table to reciprocate thereon, mechanism for reciprocating the table, a pair of vertical grinding spindles, grinding wheels carried by said spindles and adapted for operation on the sides of work reciprocated between them by the table, a third grinding-spindle, a grinding-wheel carried by the last-mentioned spindle, operative means for moving the last mentioned spindle and one of the first-mentioned spindles across the table while the table is at rest, and operative mechanism for swinging in a curve the axis of one of the first-mentioned grinding-spindles, and the axis of the last-mentioned grinding-spindles, combined substantially as set forth.

26. A grinding machine comprising in its mechanism, a bed, a table to reciprocate thereon and adapted to sustain a piece of work to be reciprocated along the bed, mechanism for reciprocating the table and the work carried by it, a rail disposed above and across the table and fixedly supported from the bed, a second rail supported by the bed parallel with the first rail and adjustable along the bed, means for adjusting the table relative to the first-mentioned rail, grinding-heads mounted in the rails, vertical grinding spindles carried by the grinding-heads, and mechanism for moving the grinding-heads along the rails, combined substantially as set forth.

27. A grinding machine comprising in its mechanism, a bed, a table to reciprocate thereon and adapted to sustain a piece of work to be reciprocated along the bed, mechanism for reciprocating the table and the work carried by it, a rail disposed above and across the table and fixedly supported from the bed, a second rail supported by the bed parallel with the first rail and adjustable along the bed, means for adjusting the table relative to the first-mentioned rail, a grinding-head mounted in the adjustable rail, a pair of grinding-heads mounted in the other rail, vertical grinding spindles carried by the grinding-heads, and mechanism for moving the grinding-heads along the rails, combined substantially as set forth.

28. A grinding machine comprising in its mechanism, a bed, a table to reciprocate thereon, mechanism for reciprocating the table, a rail disposed above and across the table, a pair of grinding-heads adjustable along the rail, an infeeding slide carried by each grinding-head, a grinding-spindle carried by each slide, infeeding mechanism carried by each grinding-head, a rod extending along the rail, connections between said rod and the two infeeding mechanisms, and operative mechanism between said rod and the table to cause the reciprocations of the table to reciprocate said rod, combined substantially as set forth.

29. A grinding machine comprising in its mechanism, a bed, a table to reciprocate thereon, mechanism for reciprocating the table, a rail disposed above and across the table and fixedly supported from the bed, a second rail supported by the bed parallel with the first rail, grinding-heads mounted in the rails, mechanism for moving the grinding-heads along the rails, and operative means for moving one of the rails along the bed toward the other rail, combined substantially as set forth.

30. A grinding machine comprising in its mechanism, a bed, a table disposed above the bed and arranged to reciprocate thereon and adapted to sustain a piece of work to be reciprocated along the bed, mechanism for reciprocating the table, a housing rigidly secured to the bed and projecting upward above and at each side of the table, and a rail extending across over the table and secured removably to the tops of the housings, combined substantially as set forth.

31. A grinding machine comprising in its mechanism a bed, a table to reciprocate thereon, mechanism for reciprocating the table, a housing rigidly secured to the bed and projecting upward at each side of the table, a rail extending across over the table and secured to the tops of the housings, and coöperating beveled engaging surfaces on the base of the rail and on the tops of the housings, combined substantially as set forth.

32. A grinding machine comprising in its mechanism, a bed, a table to reciprocate thereon, mechanism for reciprocating the table, a housing rigidly secured to the bed and projecting upward at each side of the table, a rail extending across over the table and secured to the tops of the housings, coöperating beveled-engaging surfaces on the base of the rail and on the tops of the housings, and elevating blocks adapted for disposition between the base of the rail and the tops of the housings and provided with upper and lower beveled surfaces adapted for coöperation with the beveled surfaces on the rail and housings, combined substantially as set forth.

33. A grinding machine comprising in its mechanism, a bed, a table to reciprocate thereon, mechanism for reciprocating the table, a housing secured to the bed and extending upwardly at each side of the table, a rail extending across over the table and having its base resting on the tops of the housings, a pair of projections from each housing under the base of the rail, a vertical elevating screw extending through each pair of projections and having its upper end secured to the base of the rail, and a nut disposed on each screw between the projections through which the screw passes and serving to elevate the rail from the housings by engaging the lower projection and serving to clamp the rail to the housings by engaging the upper projection, combined substantially as set forth.

34. A grinding machine comprising in its mechanism, a bed, a table, mechanism for reciprocating the table, a rail disposed above and across the table and supported by the bed, a saddle arranged to slide in the rail, a screw journaled longitudinally in the rail and projecting from one end thereof, a nut carried by the saddle and engaging the screw, a motor supported at the end of the rail, reversing gearing at the projecting end of the screw, and gearing connecting the motor with the reversing gearing combined substantially as set forth.

35. A grinding machine comprising in its mechanism, a bed, a table, mechanism for reciprocating the table, a rail disposed above and across the table and supported by the bed, a saddle arranged to slide in the rail, a screw journaled longitudinally in the rail and projecting from one end thereof, a nut carried by the saddle and engaging the screw, a motor supported at the end of the rail, reversing gearing at the projecting end of the screw, gearing connecting the motor with the reversing mechanism, a shipper-rod extending lengthwise of the rail, connections between the shipper-rod and the reversing gearing whereby the reciprocations of the rod effect the reversing of the gearing, tappets on the shipper-rod, and a dog carried by the saddle and adapted to engage said tappets and reciprocate the shipper-rod, combined substantially as set forth.

36. A grinding machine comprising in its mechanism, a bed, a table, mechanism for reciprocating the table, a rail disposed above and across the table and supported by the bed, a saddle arranged to slide in the rail, a drum mounted to turn in a bearing in the saddle, a worm-gear on the drum, a splined rod journaled longitudinally in the rail and projecting from one end thereof, a worm carried by the saddle and splined on the rod and engaging the worm-gear, a motor supported at the end of the rail, reversing gearing at the projecting end of the rod, and gearing connecting the motor with the reversing gearing, combined substantially as set forth.

37. A grinding machine comprising in its mechanism, a bed, a table, mechanism for reciprocating the table, a rail disposed above and across the table and supported by the bed, a saddle arranged to slide in the rail, a drum mounted to turn in a bearing in the saddle, a worm-gear on the drum, a splined rod journaled longitudinally in the rail and projecting from one end thereof, a worm carried by the saddle and splined on the rod and engaging the worm-gear, a motor supported at the end of the rail, reversing gearing at the projecting end of the rod, gearing connecting the motor with the reversing gearing, a shipper-rod extending lengthwise of the rail, connections between the shipper-rod and the reversing gearing whereby the reciprocations of the rod effect the reversing of the gearing, a tappet on the shipper-rod, and dogs carried by the drum and adapted to engage the tappet and reciprocate the shipper-rod, combined substantially as set forth.

38. A grinding machine comprising in its mechanism, a bed, a table, mechanism for reciprocating the table, a rail disposed above and across the table and supported by the bed, a saddle arranged to slide in the rail, a drum mounted to turn in the saddle, a worm-gear on the drum, a screw journaled longitudinally in the rail and projecting from one end thereof, a nut carried by the saddle and engaging the screw, a splined rod journaled longitudinally in the rail and projecting from the end thereof, a worm carried by the saddle and splined on the rod and engaging the worm-gear, reversing mechanism at the end of the screw, reversing mechanism at the end of the splined rod, shafts disposed in substantial alinement with each other and constituting parts of the two reversing mechanisms, a spur-gear carried by each of said shafts, a countershaft disposed parallel with said two shafts, a motor geared to the countershaft, a pinion splined on the countershaft and adapted to occupy an idle position with reference to the two spur-gears, and means for shifting the pinion into engagement with either of the spur-gears, combined substantially as set forth.

CARL BARTELS,
*One of the joint inventors.*
JOSEPH L. BLAIR,
ERNST G. RUDER,
*Administrators of the estate of George T. Reiss, the other joint inventor.*

Witnesses:
GEO. JOHNSON,
M. S. BELDEN.